(12) United States Patent
Pan et al.

(10) Patent No.: US 11,212,448 B2
(45) Date of Patent: Dec. 28, 2021

(54) SHAKE CORRECTION CONTROL DEVICE, OPERATION METHOD OF SHAKE CORRECTION CONTROL DEVICE, OPERATION PROGRAM OF SHAKE CORRECTION CONTROL DEVICE, AND IMAGING APPARATUS

(71) Applicant: FUJIFILM Corporation, Tokyo (JP)

(72) Inventors: Yi Pan, Saitama (JP); Masahiko Sugimoto, Saitama (JP); Tomonori Masuda, Saitama (JP); Takashi Hashimoto, Saitama (JP); Tetsuya Fujikawa, Saitama (JP); Yasunobu Kishine, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/324,047

(22) Filed: May 18, 2021

(65) Prior Publication Data

US 2021/0274099 A1 Sep. 2, 2021

Related U.S. Application Data

(63) Continuation of application No. PCT/JP2019/046892, filed on Nov. 29, 2019.

(30) Foreign Application Priority Data

Nov. 29, 2018 (JP) .............................. JP2018-224228

(51) Int. Cl.
*H04N 5/232* (2006.01)

(52) U.S. Cl.
CPC ..... *H04N 5/23287* (2013.01); *H04N 5/23254* (2013.01)

(58) Field of Classification Search
CPC ........... H04N 5/23254; H04N 5/23287; H04N 5/23248–2329; G03B 2207/005; G03B 2205/0007–0038; G02B 27/646
(Continued)

(56) References Cited

U.S. PATENT DOCUMENTS

| 2013/0155262 | A1 | 6/2013 | Katoh et al. |
| 2017/0214853 | A1 | 7/2017 | Koyano |
| 2019/0199930 | A1* | 6/2019 | Noguchi ............ H04N 5/23264 |

FOREIGN PATENT DOCUMENTS

| JP | 2013126075 | 6/2013 |
| JP | 2016024235 | 2/2016 |
| JP | 2017129785 | 7/2017 |

OTHER PUBLICATIONS

"International Search Report (Form PCT/ISA/210) of PCT/JP2019/046892," dated Feb. 18, 2020, with English translation thereof, pp. 1-5.

(Continued)

*Primary Examiner* — Xi Wang
(74) *Attorney, Agent, or Firm* — JCIPRNET

(57) ABSTRACT

A shake correction control device includes an acquisition unit and an operation control unit. The acquisition unit acquires, for each predetermined time, a related amount related to an operation recommendation condition under which an operation of a mechanical correction unit which corrects a shake of a subject image by mechanically moving at least one of a correction optical system or an imaging element is recommended. The operation control unit controls the operation of the mechanical correction unit and an operation of an electronic correction unit which corrects the shake by performing image processing on an image obtained by imaging performed by the imaging element. In a case where a state where the related amount acquired in the acquisition unit satisfies the operation recommendation con- (Continued)

dition does not continue for a setting period defined by a time series of a plurality of consecutive times, the operation control unit performs a control for operating only the electronic correction unit out of the mechanical correction unit and the electronic correction unit.

20 Claims, 19 Drawing Sheets

(58) Field of Classification Search
USPC .................. 348/208.5, 208.4, 208.2, 208.1; 396/52–55; 359/554–557
See application file for complete search history.

(56) References Cited

OTHER PUBLICATIONS

"Written Opinion of the International Searching Authority (Form PCT/ISA/237) of PCT/JP2019/046892," dated Feb. 18, 2020, with English translation thereof, pp. 1-7.

* cited by examiner

SHAKE CORRECTION CONTROL DEVICE, OPERATION METHOD OF SHAKE CORRECTION CONTROL DEVICE, OPERATION PROGRAM OF SHAKE CORRECTION CONTROL DEVICE, AND IMAGING APPARATUS

CROSS-REFERENCE TO RELATED APPLICATIONS

This application is a continuation application of International Application No. PCT/JP2019/046892 filed Nov. 29, 2019, the disclosure of which is incorporated herein by reference in its entirety. Further, this application claims priority from Japanese Patent Application No. 2018-224228 filed on Nov. 29, 2018, the disclosure of which is incorporated herein by reference in its entirety.

BACKGROUND OF THE INVENTION

1. Technical Field of the Invention

The technology of the present disclosure relates to a shake correction control device, an operation method of a shake correction control device, an operation program of a shake correction control device, and an imaging apparatus.

2. Description of the Related Art

A mechanical correction unit and an electronic correction unit are generally known as a correction unit correcting a shake of a subject image (hereinafter, referred to as the "shake of the subject image" or simply the "shake") obtained by forming an image of subject light showing a subject by an imaging apparatus. The mechanical correction unit corrects the shake by mechanically moving at least one of a correction optical system or an imaging element. The electronic correction unit corrects the shake by performing image processing on an image obtained by imaging performed by the imaging element.

An imaging apparatus disclosed in JP2013-126075A comprises a mechanical correction unit and an electronic correction unit. In the imaging apparatus disclosed in JP2013-126075A, a shutter speed (exposure time period) of an electronic shutter in an imaging element and an amount of the shake are acquired. The mechanical correction unit and the electronic correction unit selectively operate depending on the exposure time period and the amount of the shake. Specifically, in a case where the exposure time period is greater than a setting amount, only the mechanical correction unit out of the mechanical correction unit and the electronic correction unit operates. In a case where the exposure time period is less than or equal to the setting amount, only the electronic correction unit out of the mechanical correction unit and the electronic correction unit operates. In addition, in a case where the amount of the shake is greater than or equal to a setting amount, only the mechanical correction unit out of the mechanical correction unit and the electronic correction unit operates. In a case where the amount of the shake is less than the setting amount, only the electronic correction unit out of the mechanical correction unit and the electronic correction unit operates.

SUMMARY

An object of the technology of the present disclosure is to provide a shake correction control device, an operation method of a shake correction control device, an operation program of a shake correction control device, and an imaging apparatus capable of decreasing an operation time period of a mechanical correction unit in a case of selectively operating the mechanical correction unit and an electronic correction unit.

In order to achieve the above object, a shake correction control device of the present disclosure comprises an acquisition unit that acquires, for each predetermined time, a related amount related to an operation recommendation condition under which an operation of a mechanical correction unit which corrects a shake of a subject image by mechanically moving at least one of a correction optical system or an imaging element is recommended, and an operation control unit that controls the operation of the mechanical correction unit and an operation of an electronic correction unit which corrects the shake by performing image processing on an image obtained by imaging performed by the imaging element, and performs a control for operating only the electronic correction unit out of the mechanical correction unit and the electronic correction unit in a case where a state where the related amount acquired in the acquisition unit satisfies the operation recommendation condition does not continue for a setting period defined by a time series of a plurality of consecutive times.

It is preferable that in a case where a state where the related amount acquired in the acquisition unit satisfies the operation recommendation condition continues for the setting period, the operation control unit performs a control for operating only the mechanical correction unit out of the mechanical correction unit and the electronic correction unit.

It is preferable that the shake correction control device further comprises a changing unit that changes the setting period.

It is preferable that the related amount is an exposure time period of the subject image in the imaging element. In this case, it is preferable that the operation recommendation condition is a condition that the exposure time period is greater than or equal to a first setting amount.

It is preferable that the related amount is an amplitude of the shake and a frequency of the shake. In this case, it is preferable that the operation recommendation condition is a condition that a shake having the amplitude greater than or equal to a second setting amount and the frequency greater than or equal to a third setting amount is present.

It is preferable that the second setting amount is an amount that is decreased as the frequency is increased. In addition, it is preferable that the third setting amount is an amount that is decreased as the amplitude is increased.

It is preferable that the related amount is an amount of the shake within an exposure time period of the subject image in the imaging element. In this case, it is preferable that the operation recommendation condition is a condition that the amount of the shake is greater than or equal to a fourth setting amount.

It is preferable that the acquisition unit acquires the related amount for each of consecutive frames.

It is preferable that the shake correction control device is used in a monitoring camera system.

An imaging apparatus of the present disclosure comprises the shake correction control device.

An operation method of a shake correction control device of the present disclosure comprises an acquisition step of acquiring, for each predetermined time, a related amount related to an operation recommendation condition under which an operation of a mechanical correction unit which corrects a shake of a subject image by mechanically moving at least one of a correction optical system or an imaging element is recommended, and an operation control step of controlling the operation of the mechanical correction unit and an operation of an electronic correction unit which corrects the shake by performing image processing on an image obtained by imaging performed by the imaging element, and performing a control for operating only the electronic correction unit out of the mechanical correction unit and the electronic correction unit in a case where a state where the related amount acquired in the acquisition step satisfies the operation recommendation condition does not continue for a setting period defined by a time series of a plurality of consecutive times.

An operation program of a shake correction control device of the present disclosure is a program causing a computer to function as an acquisition unit that acquires, for each predetermined time, a related amount related to an operation recommendation condition under which an operation of a mechanical correction unit which corrects a shake of a subject image by mechanically moving at least one of a correction optical system or an imaging element is recommended, and an operation control unit that controls the operation of the mechanical correction unit and an operation of an electronic correction unit which corrects the shake by performing image processing on an image obtained by imaging performed by the imaging element, and performs a control for operating only the electronic correction unit out of the mechanical correction unit and the electronic correction unit in a case where a state where the related amount acquired in the acquisition unit satisfies the operation recommendation condition does not continue for a setting period defined by a time series of a plurality of consecutive times.

According to the technology of the present disclosure, a shake correction control device, an operation method of a shake correction control device, an operation program of a shake correction control device, and an imaging apparatus capable of decreasing an operation time period of a mechanical correction unit in a case of selectively operating the mechanical correction unit and an electronic correction unit can be provided.

BRIEF DESCRIPTION OF THE DRAWINGS

Exemplary embodiments according to the technique of the present disclosure will be described in detail based on the following figures, wherein:

FIG. 9A illustrates a state where a correction unit to be operated in the frame F55 is selected depending on exposure time periods of the frame F50 to the frame F54, and FIG. 9B illustrates a state where a correction unit to be operated in the frame F56 is selected depending on exposure time periods of the frame F51 to the frame F55;

FIG. 10A illustrates a state where a correction unit to be operated in the frame F57 is selected depending on exposure time periods of the frame F52 to the frame F56, and FIG. 10B illustrates a state where a correction unit to be operated in the frame F58 is selected depending on exposure time periods of the frame F53 to the frame F57;

FIG. 11A illustrates a state where a correction unit to be operated in the frame F59 is selected depending on exposure time periods of the frame F54 to the frame F58, FIG. 11B illustrates a state where a correction unit to be operated in the frame F60 is selected depending on exposure time periods of the frame F55 to the frame F59, and FIG. 11C illustrates a state where a correction unit to be operated in the frame F61 is selected depending on exposure time periods of the frame F56 to the frame F60;

FIG. 15A illustrates a graph illustrating a change in exposure time period of a frame F70 to a frame F80, FIG. 15B illustrates a table illustrating a correction unit operating in each frame in a case of switching the correction unit to be operated depending on the exposure time period of 1 frame, and FIG. 15C illustrates a table illustrating a correction unit operating in each frame in a case of switching the correction unit to be operated using the setting illustrated in the table of FIG. 14;

FIG. 20A illustrates an example of changing the second setting amount and the third setting amount in a curved manner, and FIG. 20B illustrates an example of changing the second setting amount and the third setting amount in a stepwise manner;

FIG. 23A illustrates an aspect of providing a management apparatus with a function of the shake correction control device, and FIG. 23B illustrates an aspect of disposing the shake correction control device separately from the monitoring camera and the management apparatus.

DETAILED DESCRIPTION

Hereinafter, an example of embodiments of the technology of the present disclosure will be described with reference to the drawings.

First Embodiment

Figure 1:
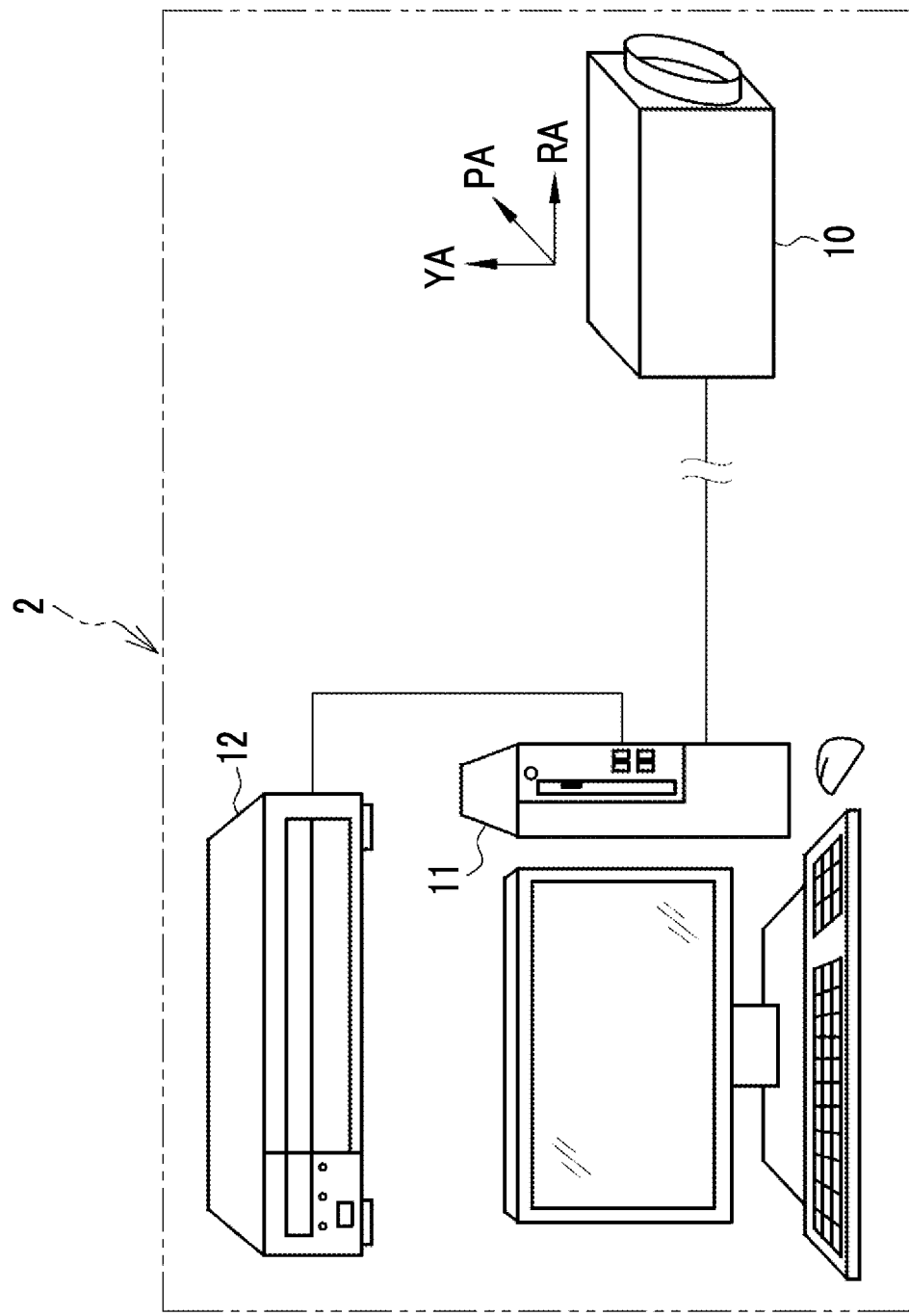
FIG. 1 is a diagram illustrating a monitoring camera system.

In FIG. 1, a monitoring camera system 2 comprises a monitoring camera 10, a management apparatus 11, and a storage apparatus 12. The monitoring camera 10 is an example of an "imaging apparatus" according to the embodiment of the technology of the present disclosure, and is installed on a post, a wall, or the like in an indoor or outdoor space and generates a motion picture of a monitoring target by imaging the monitoring target. The monitoring camera 10 transmits the generated motion picture to the management apparatus 11. The management apparatus 11 is installed in a different location from the monitoring camera 10. Here, the "different location" refers to, for example, a management room. The management apparatus 11 receives the motion picture from the monitoring camera 10. The management apparatus 11 transmits the received motion picture to the storage apparatus 12 and stores the motion picture in the storage apparatus 12.

Figure 2:
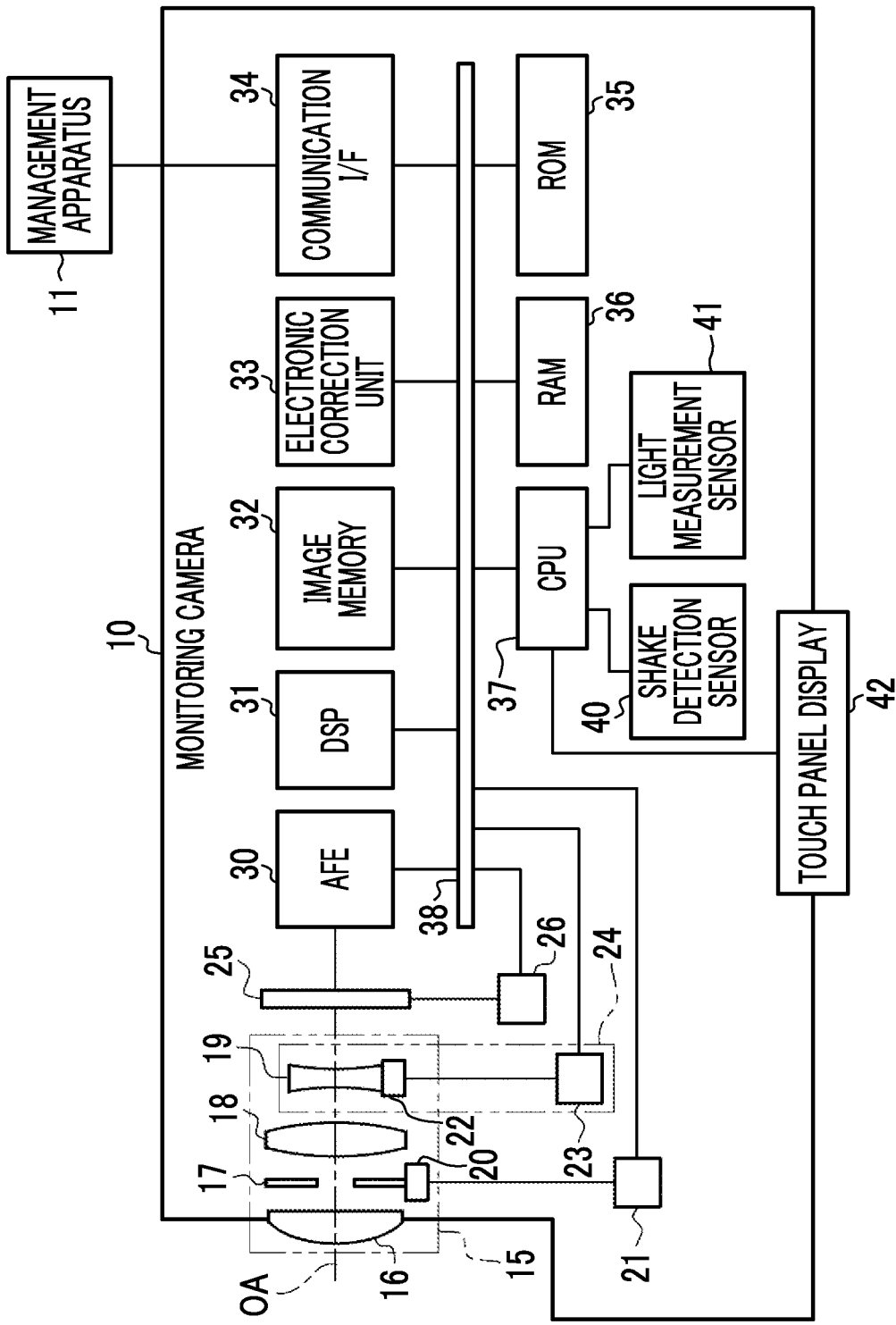
FIG. 2 is a block diagram of a monitoring camera.

In FIG. 2, the monitoring camera 10 includes an imaging optical system 15. The imaging optical system 15 comprises a first optical system 16, a stop 17, a second optical system 18, and a correction optical system 19. The first optical system 16 is an optical system including an objective lens and forms an image of subject light showing a subject as a subject image on a light-receiving surface of an imaging element 25 described later. The stop 17 adjusts a light quantity of the subject image reaching the second optical system 18 from the first optical system 16. An actuator 20 is attached to the stop 17. Driving of the actuator 20 is controlled by a driver 21. By driving the actuator 20 under control of the driver 21, an opening degree of the stop 17 is changed.

Vibrations (hereinafter, simply referred to as the "vibrations") exerted on the monitoring camera 10 include, in a case of the outdoor space, vibrations caused by traffic of an automobile, vibrations caused by wind, vibrations caused by construction work, and the like and, in a case of the indoor space, vibrations caused by an operation of an air conditioner, vibrations caused by entrance and exit of a person, and the like. The correction optical system 19 is an optical system for correcting a shake of the subject image caused by the vibrations. An actuator 22 is attached to the correction optical system 19. Driving of the actuator 22 is controlled by a driver 23. By driving the actuator 22 under control of the driver 23, the correction optical system 19 mechanically moves with respect to an optical axis OA.

In the present embodiment, the "shake" refers to a phenomenon that occurs by a change in the optical axis OA with respect to the subject image due to the vibrations. Here, the "optical axis OA" refers to an optical axis of the objective lens of the first optical system 16. For example, the change in the optical axis OA means that the optical axis OA is inclined with respect to a reference axis (for example, the optical axis OA before an occurrence of the shake) due to the shake. In the present embodiment, correction of the shake includes a meaning of removing the shake and also a meaning of reducing the shake.

A mechanical correction unit 24 is implemented by the correction optical system 19, the actuator 22, and the driver 23. Various well-known methods can be employed as a method of correcting the shake by the mechanical correction unit 24. The simplest method is such that the mechanical correction unit 24 moves the correction optical system 19 in a direction of canceling out the shake by an amount of canceling out the shake.

The imaging element 25 is arranged in a back stage of the imaging optical system 15. For example, the imaging element 25 is a charge coupled device (CCD) image sensor. The imaging element 25 performs imaging based on visible light, for example, light on a short wavelength side of less than or equal to approximately 700 nm. However, the present embodiment is not limited thereto, and the imaging element 25 may perform imaging based on infrared light, for example, light on a long wavelength side of greater than approximately 700 nm. In this case, photoelectric conversion elements having sensitivity to the infrared light may be used as pixels of the imaging element 25. Particularly, for imaging based on short-wavelength infrared light (SWIR), for example, an InGaAs image sensor and/or a type-II quantum well structure (T2SL; simulation of type-II quantum well) image sensor may be used as the imaging element 25. The imaging element 25 images the subject image acquired by the imaging optical system 15 and outputs an analog imaging signal at a predetermined frame rate under control of a driver 26. Here, for example, the "predetermined frame rate" refers to a few frames/second to a few tens of frames/second.

The monitoring camera 10 includes an analog front end (AFE) 30, a digital signal processor (DSP) 31, an image memory 32, an electronic correction unit 33, a communication interface (I/F) 34, a read only memory (ROM) 35, a random access memory (RAM) 36, a central processing unit (CPU) 37, and the like. The AFE 30, the DSP 31, the image memory 32, the electronic correction unit 33, the communication I/F 34, the ROM 35, the RAM 36, and the CPU 37 are connected to each other through a busline 38. The ROM 35, the RAM 36, the CPU 37, and the busline 38 are an example of a "computer" according to the embodiment of the technology of the present disclosure.

The AFE 30 receives the analog imaging signal from the imaging element 25. The AFE 30 performs analog signal processing such as correlative double sampling and automatic gain adjustment on the analog imaging signal and then, converts the analog imaging signal into a digital imaging signal by performing analog/digital (A/D) conversion. The imaging element 25 may be a metal oxide semiconductor (MOS) image sensor or a complementary metal oxide semiconductor (CMOS) image sensor. In a case where the imaging element 25 is the CMOS image sensor, a part or all of the AFE 30 and the DSP 31 may be integrated in the CMOS image sensor. In this case, the AFE 30 may have only an A/D conversion function.

The DSP 31 performs various types of digital signal processing on the digital imaging signal. For example, the various types of digital signal processing refer to demosaicing, noise removal processing, gradation correction processing, and color correction processing. The DSP 31 outputs the imaging signal after digital signal processing to the image memory 32. The image memory 32 stores the imaging signal from the DSP 31 as an image representing the subject image.

The electronic correction unit 33 corrects the shake of the subject image by performing image processing on the image stored in the image memory 32. In the same manner as in a case of the mechanical correction unit 24, various well-known methods can be employed as a method of correcting the shake by the electronic correction unit 33.

For example, the method of correcting the shake by the electronic correction unit 33 is exemplified by an image output region cutout method and an image comparison method. In the image output region cutout method, first, the imaging element 25 sets an imaging region to be larger than a region (hereinafter, an image output region) finally output as the image. The electronic correction unit 33 cuts out an image corresponding to the image output region from the image stored in the image memory 32. At this point, the electronic correction unit 33 changes a cutout position of the image output region depending on the shake.

In the image comparison method, first, the electronic correction unit 33 acquires images preceding and succeeding in time series from the image memory 32 and compares the acquired images preceding and succeeding in time series. Next, the electronic correction unit 33 calculates a deviation amount and a deviation direction of the succeeding image with respect to the preceding image based on a result of comparison between the images. The electronic correction unit 33 processes the succeeding image into an image in which the calculated deviation amount and the deviation direction are canceled out. Hereinafter, the mechanical correction unit 24 and the electronic correction unit 33 will be referred to as the "correction unit" without a reference sign unless necessary to distinguish for description.

The communication I/F 34 reads out the image from the image memory 32 and transmits the read image to the management apparatus 11. For example, the communication I/F 34 is a network interface. The network interface controls transfer of various types of information with respect to the management apparatus 11 through a network. One example of the network is exemplified by a wide area network (WAN) such as the Internet or a public communication network.

The ROM 35 stores various programs such as a control program of the monitoring camera 10 and various types of data accompanied by the various programs. The RAM 36 is a work memory for the CPU 37 to execute processing. The CPU 37 reads out a program stored in the ROM 35 into the RAM 36 and executes processing complying with the read program. Accordingly, the CPU 37 controls an overall operation of each unit of the monitoring camera 10.

A shake detection sensor 40, a light measurement sensor 41, and a touch panel display 42 are connected to the CPU 37. For example, the shake detection sensor 40 is a gyro sensor. The gyro sensor detects a rotational shake about each axis (refer to FIG. 1) of a pitch axis PA, a yaw axis YA, and a roll axis RA (axis parallel to the optical axis OA). In addition, for example, the shake detection sensor 40 is an acceleration sensor. The acceleration sensor detects a shift shake within a plane parallel to the pitch axis PA and the yaw axis YA. The shake detection sensor 40 outputs a detection signal of the shake to the CPU 37. A meaning of being parallel in the present embodiment includes a meaning of being completely parallel and also a meaning of being approximately parallel including an error allowed in design and manufacturing.

The light measurement sensor 41 measures the light quantity of the subject image for each frame in order to perform an automatic exposure (AE) control. The light measurement sensor 41 outputs a measurement signal of the light quantity to the CPU 37.

The touch panel display 42 is a device in which a touch panel is overlaid on a display. The display displays various types of information including an image under control of the CPU 37. The touch panel is overlaid on a display screen of the display and receives contact with a finger of a user or an instruction object such as a touch pen. A setting screen or the like for performing various types of setting of the monitoring camera 10 is displayed on the touch panel display 42. The touch panel display 42 receives an input of an operation instruction from the user through the setting screen or the like.

Figure 3:
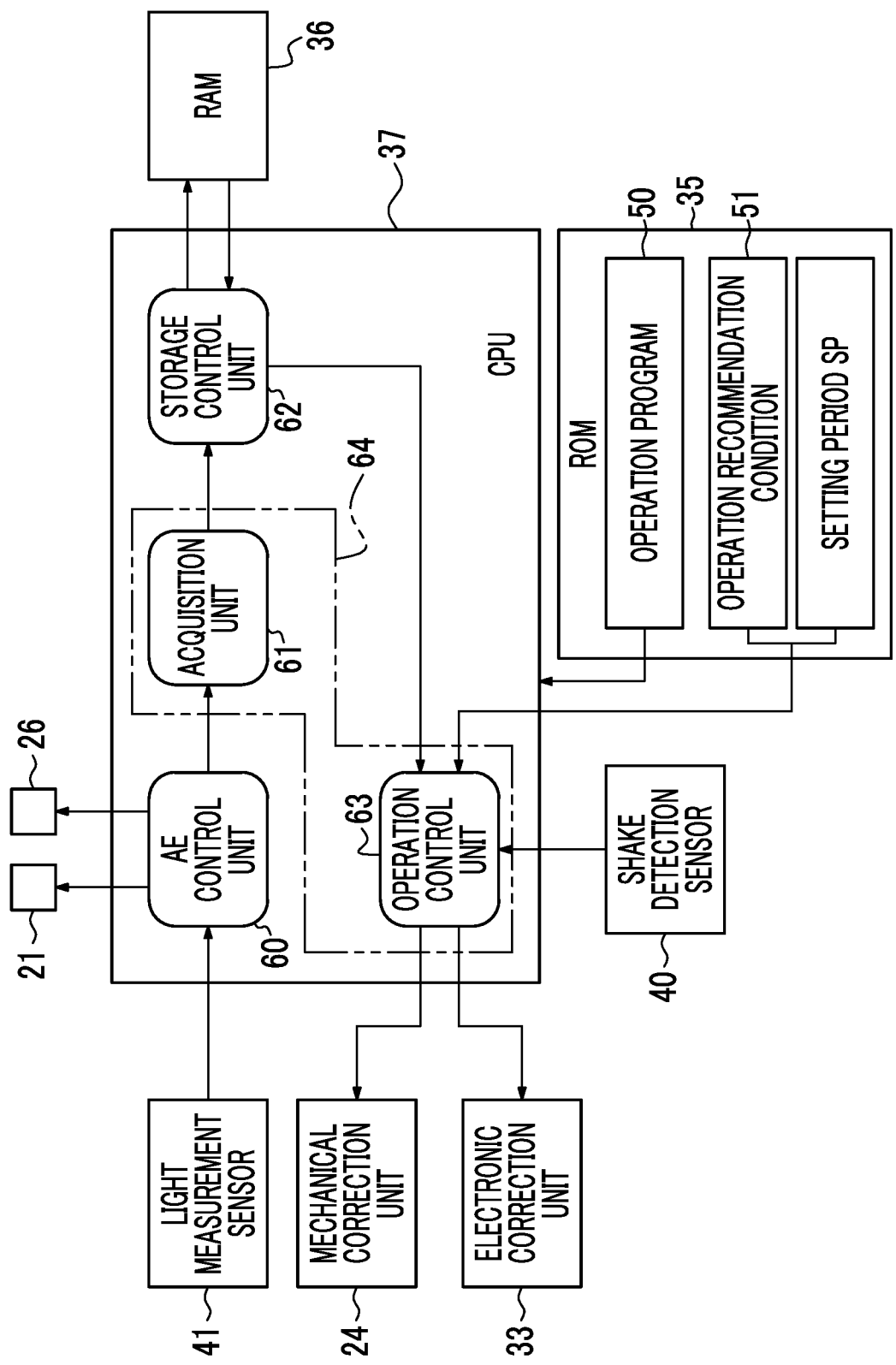
FIG. 3 is a block diagram of a CPU of the monitoring camera.

In FIG. 3, an operation program 50 is stored in the ROM 35. The operation program 50 is a program for causing the monitoring camera 10 to function as a shake correction control device. The operation program 50 is an example of an "operation program of the shake correction control device" according to the embodiment of the technology of the present disclosure.

In addition, an operation recommendation condition 51 and a setting period SP are stored in the ROM 35. The operation recommendation condition 51 is a condition under which an operation of the mechanical correction unit 24 is recommended. The setting period SP is a period defined by a time series of a plurality of consecutive frames.

The CPU 37 functions as an AE control unit 60, an acquisition unit 61, a storage control unit 62, and an operation control unit 63 in cooperation with the RAM 36 and the like by executing the operation program 50. A shake correction control device 64 is implemented by the acquisition unit 61 and the operation control unit 63 among the AE control unit 60, the acquisition unit 61, the storage control unit 62, and the operation control unit 63.

The AE control unit 60 receives the measurement signal of the light quantity from the light measurement sensor 41. The AE control unit 60 sets an exposure value corresponding to the received measurement signal of the light quantity. The AE control unit 60 sets the exposure value for each frame. More specifically, the AE control unit 60 sets the exposure value of the subsequent frame based on the measurement signal of the light quantity of the previous frame.

The AE control unit 60 calculates the opening degree of the stop 17 corresponding to the set exposure value. The AE control unit 60 drives the actuator 20 through the driver 21 such that the actual opening degree of the stop 17 is set to the calculated opening degree.

In addition, the AE control unit 60 calculates an exposure time period of the subject image corresponding to the set exposure value in the imaging element 25. The AE control unit 60 drives the imaging element 25 through the driver 26 such that the actual exposure time period is set to the calculated exposure time period. The AE control unit 60 outputs the calculated exposure time period to the acquisition unit 61.

The acquisition unit 61 acquires the exposure time period from the AE control unit 60. The exposure time period acquired by the acquisition unit 61 is an example of a "related amount" according to the embodiment of the technology of the present disclosure and corresponds to a related amount that is related to the operation recommendation condition 51. In addition, as described above, since the AE control unit 60 sets the exposure value for each frame, the AE control unit 60 calculates the exposure time period for each frame and outputs the exposure time period to the acquisition unit 61 for each frame. Thus, the acquisition unit 61 acquires the exposure time period for each of the consecutive frames. A time at which the exposure time period of each of the consecutive frames is acquired by the acquisition unit 61 is an example of a "predetermined time" according to the embodiment of the technology of the present disclosure. The acquisition unit 61 outputs the acquired exposure time period to the storage control unit 62.

The storage control unit 62 performs a control for storing the exposure time period from the acquisition unit 61 in the RAM 36. In addition, the storage control unit 62 reads out a plurality of the exposure time periods corresponding to a plurality of the consecutive frames from the RAM 36 and outputs the read plurality of exposure time periods to the operation control unit 63.

The operation control unit 63 receives the detection signal of the shake from the shake detection sensor 40. The operation control unit 63 controls the operations of the mechanical correction unit 24 and the electronic correction unit 33 based on the received detection signal in order to cancel out the shake of the subject image.

The operation control unit 63 reads out the operation recommendation condition 51 and the setting period SP from the ROM 35. A control for selectively operating the mechanical correction unit 24 and the electronic correction unit 33 in the subsequent frame of the plurality of subsequent frames is performed in accordance with the operation recommendation condition 51, the setting period SP, and the plurality of exposure time periods corresponding to the plurality of consecutive frames from the storage control unit 62.

More specifically, in a case where a state where the exposure time period satisfies the operation recommendation condition 51 does not continue for the setting period SP, the operation control unit 63 performs a control for operating only the electronic correction unit 33 out of the mechanical correction unit 24 and the electronic correction unit 33. Meanwhile, in a case where a state where the exposure time period satisfies the operation recommendation condition 51 continues for the setting period SP, the operation control unit 63 operates only the mechanical correction unit 24 out of the mechanical correction unit 24 and the electronic correction unit 33.

Figure 4:
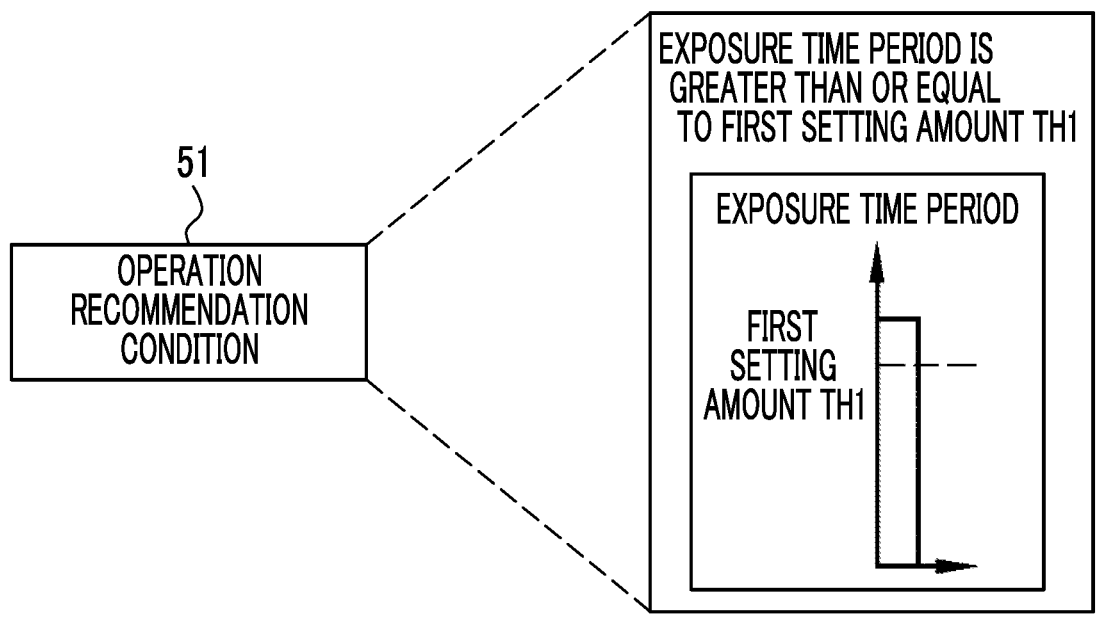
FIG. 4 is a diagram illustrating a content of an operation recommendation condition.

As illustrated in FIG. 4, the operation recommendation condition 51 is a condition that the exposure time period is greater than or equal to a first setting amount TH1.

Figure 5:
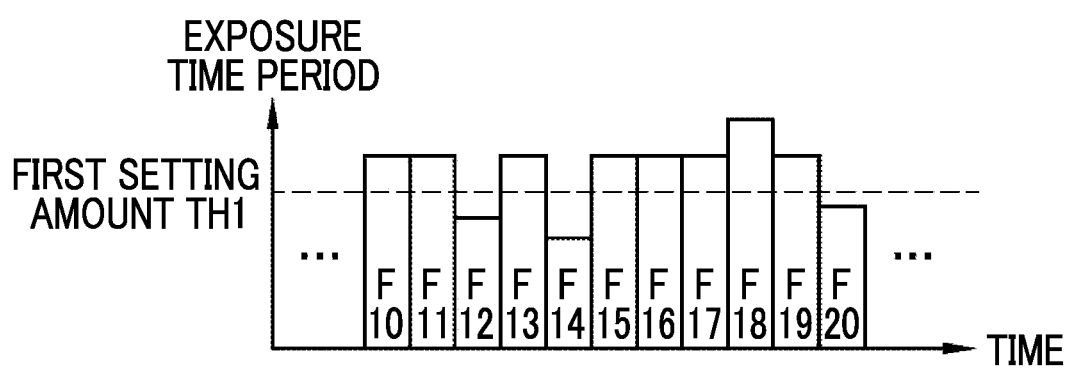
FIG. 5 is a graph illustrating a change in exposure time period of a frame F10 to a frame F20.

FIG. 5 is a graph illustrating a change in exposure time period of a frame F10 to a frame F20. Among the frame F10 to the frame F20, the frame F10, for the frame F11, the frame F13, and the frame F15 to the frame F19, the exposure time period is greater than or equal to the first setting amount TH1, and thus, the operation recommendation condition 51 is satisfied. Meanwhile, for the frame F12, the frame F14, and the frame F20, the exposure time period is less than the first setting amount TH1, and thus, the operation recommendation condition 51 is not satisfied.

Figure 6:
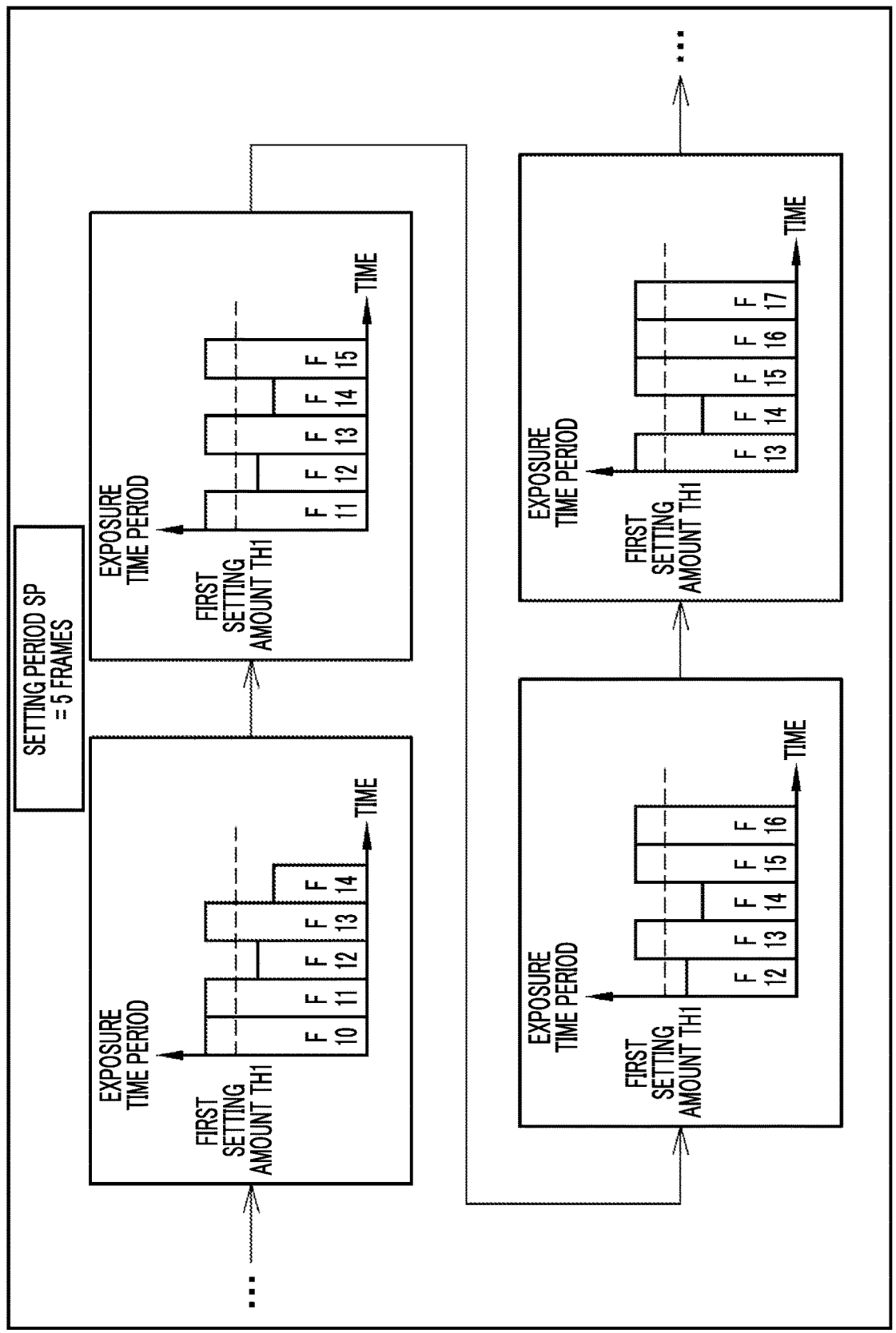
FIG. 6 is a diagram for describing processing of a storage control unit.

As illustrated in FIG. 6, the storage control unit 62 stores the plurality of exposure time periods corresponding to the plurality of consecutive frames defining the setting period SP in the RAM 36 while sequentially updating the exposure time period of the oldest frame to the exposure time period of the newest frame. A set of the plurality of exposure time periods is sequentially output to the operation control unit 63 for each frame.

In FIG. 6, the setting period SP is 5 frames, and a state where the exposure time periods of the frame F10 to the frame F20 illustrated in FIG. 5 are sequentially stored in the ROM 35 is illustrated. An upper left part of FIG. 6 illustrates a state where the exposure time periods of the frame F10 to the frame F14 are stored in the ROM 35. In an upper right part of FIG. 6 in which an acquisition time period corresponding to 1 frame has elapsed from the state, the exposure time period of the oldest frame F10 in the upper left part of FIG. 6 is updated to the exposure time period of the newest frame F15. Similarly, the exposure time periods of the frame F12 to the frame F16 are stored in the ROM 35 in a lower left part of FIG. 6, and the exposure time periods of the frame F13 to the frame F17 are stored in the ROM 35 in a lower right part of FIG. 6.

Figure 7:
FIG. 7 is a table illustrating setting of processing of an operation control unit.

As illustrated in a table 70 of FIG. 7, in a case where a number N of frames satisfying the operation recommendation condition 51 is the same as the number of frames defining the setting period SP, the operation control unit 63 performs a control for operating only the mechanical correction unit 24 out of the mechanical correction unit 24 and the electronic correction unit 33 in the subsequent frame. Meanwhile, in a case where the number N of frames satisfying the operation recommendation condition 51 is different from the number of frames defining the setting period SP, the operation control unit 63 performs a control for operating only the electronic correction unit 33 out of the mechanical correction unit 24 and the electronic correction unit 33 in the subsequent frame. In the following drawings, the mechanical correction unit 24 is illustrated by a mark of "M" surrounded by a circle, and the electronic correction unit 33 is illustrated by a mark of "E" surrounded by a circle.

A case where the number N of frames satisfying the operation recommendation condition 51 is the same as the number of frames defining the setting period SP has the same meaning as a case where a state where the exposure time period satisfies the operation recommendation condition 51 continues for the setting period SP. In addition, a case where the number N of frames satisfying the operation recommendation condition 51 is different from the number of frames defining the setting period SP has the same meaning as a case where a state where the exposure time period satisfies the operation recommendation condition 51 does not continue for the setting period SP.

FIG. 7 illustrates a case where the setting period SP is the same 5 frames as in a case of FIG. 6. In this example, only the mechanical correction unit 24 is operated in the subsequent frame in a case where the number N of frames satisfying the operation recommendation condition 51 is 5. Meanwhile, only the electronic correction unit 33 is operated in the subsequent frame in a case where the number N of frames satisfying the operation recommendation condition 51 is 0 to 4.

Figure 8:
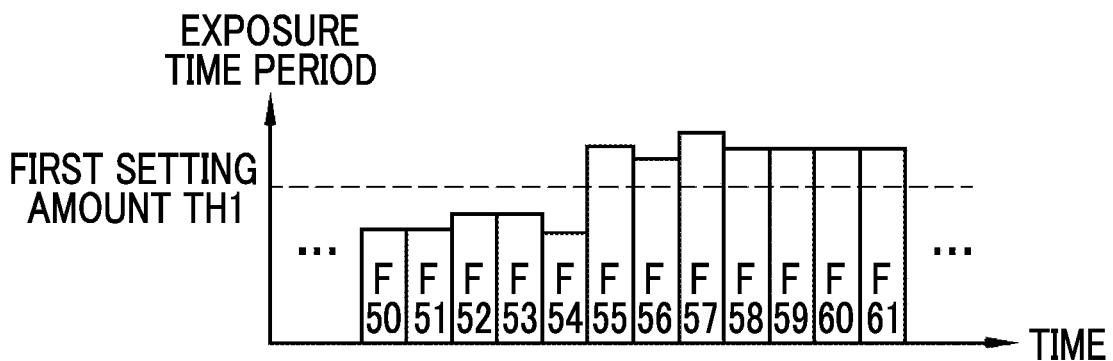
FIG. 8 is a graph illustrating a change in exposure time period of a frame F50 to a frame F61.

FIG. 8 is a graph illustrating a change in exposure time period of a frame F50 to a frame F61. Among the frame F50 to the frame F61, for the frame F50 to the frame F54, the exposure time period is less than the first setting amount TH1, and thus, the operation recommendation condition 51 is not satisfied. Meanwhile, for the frame F55 to the frame F61, the exposure time period is greater than or equal to the first setting amount TH1, and thus, the operation recommendation condition 51 is satisfied.

Figure 9A:
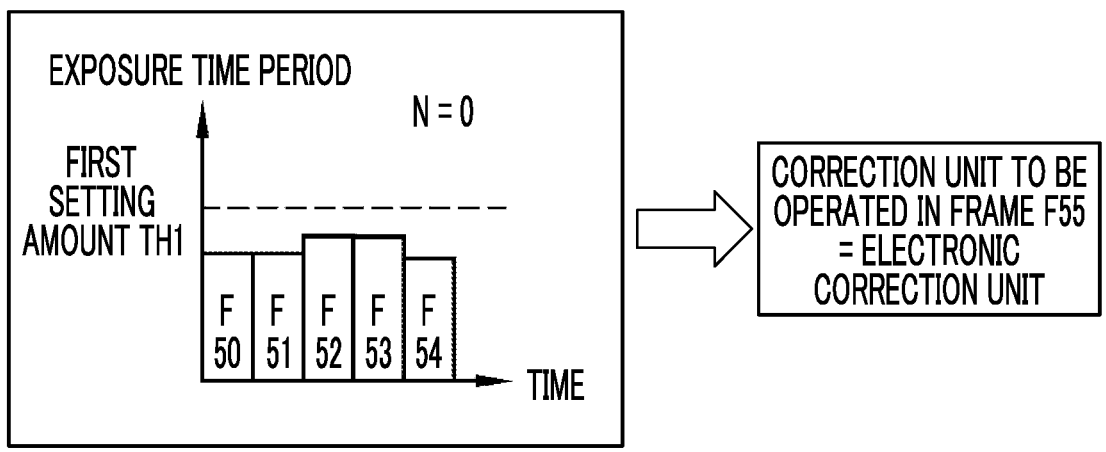
FIGS. 9A and 9B are diagrams illustrating which correction unit operates in the setting illustrated in the table of FIG. 7 in a case where the exposure time period changes as in FIG. 8.

FIG. 9A to FIG. 11C are diagrams specifically illustrating which correction unit operates in the setting illustrated in the table 70 of FIG. 7 in a case where the exposure time period changes as in FIG. 8. First, FIG. 9A illustrates a state where a correction unit to be operated in the frame F55 is selected depending on the exposure time periods of the frame F50 to the frame F54. All of the exposure time periods of the frame F50 to the frame F54 do not satisfy the operation recommendation condition 51. That is, the number N of frames satisfying the operation recommendation condition 51 is 0 and is different from 5 which is the number of frames defining the setting period SP. Thus, the operation control unit 63 operates only the electronic correction unit 33 in the frame F55.

Figure 9B:
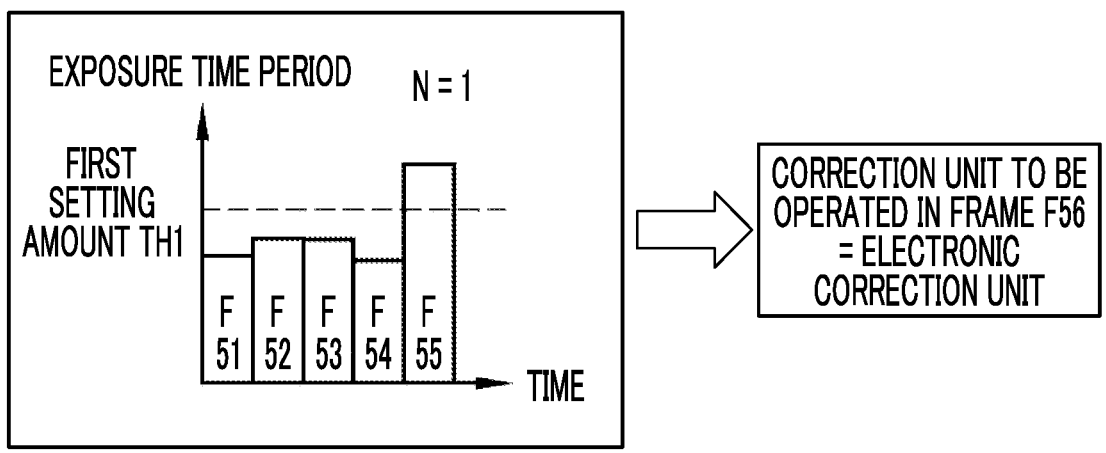

Next, FIG. 9B illustrates a state where a correction unit to be operated in the frame F56 is selected depending on the exposure time periods of the frame F51 to the frame F55. For the frame F51 to the frame F55, the exposure time period does not satisfy the operation recommendation condition 51 except for the frame F55. That is, the number N of frames satisfying the operation recommendation condition 51 is 1 and is different from 5 which is the number of frames defining the setting period SP. Thus, the operation control unit 63 operates only the electronic correction unit 33 in the frame F56 in the same manner as in a case of FIG. 9A.

Figure 10A:
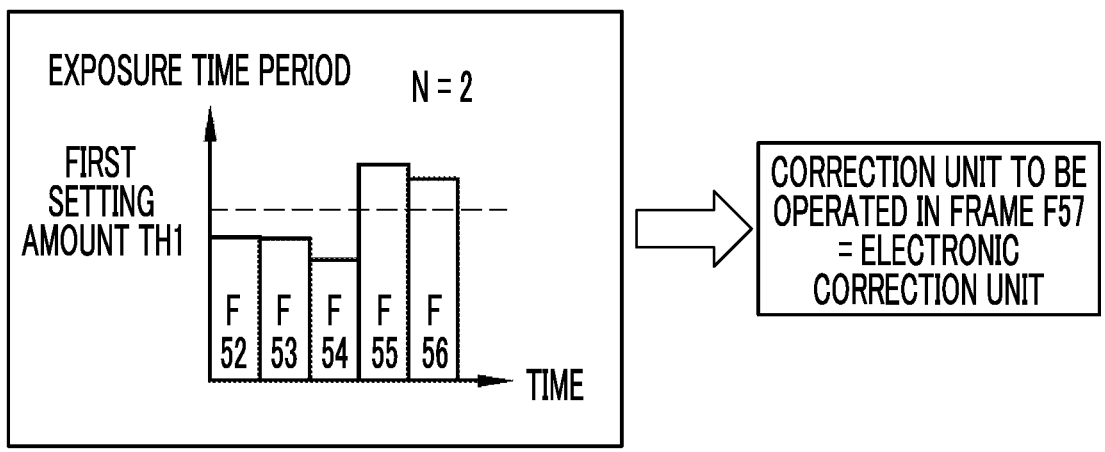
FIGS. 10A and 10B are diagrams illustrating which correction unit operates in the setting illustrated in the table of FIG. 7 in a case where the exposure time period changes as in FIG. 8.

FIG. 10A illustrates a state where a correction unit to be operated in the frame F57 is selected depending on the exposure time periods of the frame F52 to the frame F56. For the exposure time periods of the frame F52 to the frame F56, the frame F52 to the frame F54 do not satisfy the operation recommendation condition 51, and the frame F55 and the frame F56 satisfy the operation recommendation condition 51. That is, the number N of frames satisfying the operation recommendation condition 51 is 2 and is different from 5 which is the number of frames defining the setting period SP. Thus, the operation control unit 63 operates only the electronic correction unit 33 in the frame F57 in the same manner as in a case of FIG. 9A and FIG. 9B.

Figure 10B:
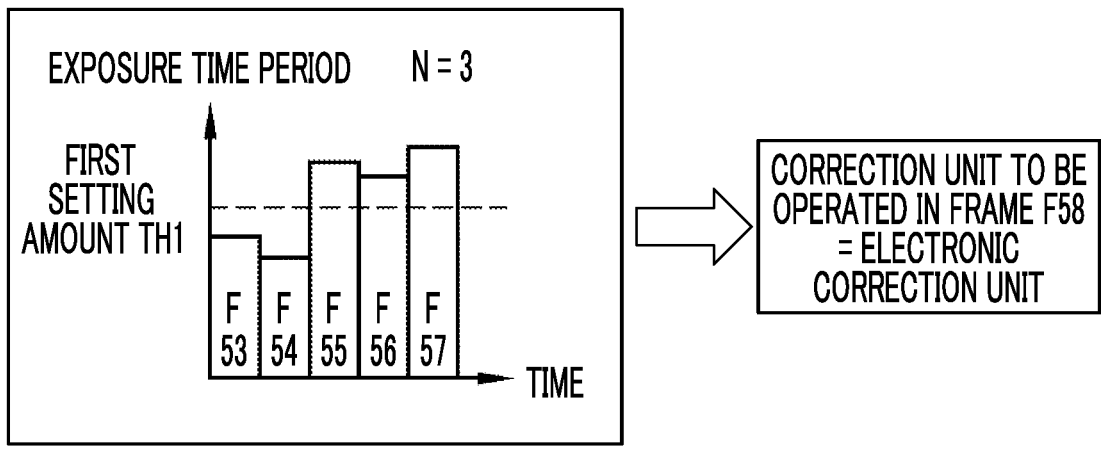

Next, FIG. 10B illustrates a state where a correction unit to be operated in the frame F58 is selected depending on the exposure time periods of the frame F53 to the frame F57. For the exposure time periods of the frame F53 to the frame F57, the frame F53 and the frame F54 do not satisfy the operation recommendation condition 51, and the frame F55 to the frame F57 satisfy the operation recommendation condition 51. That is, the number N of frames satisfying the operation recommendation condition 51 is 3 and is different from 5 which is the number of frames defining the setting period SP. Thus, the operation control unit 63 operates only the electronic correction unit 33 in the frame F58 in the same manner as in a case of FIG. 9A, FIG. 9B, and FIG. 10A.

Figure 11A:
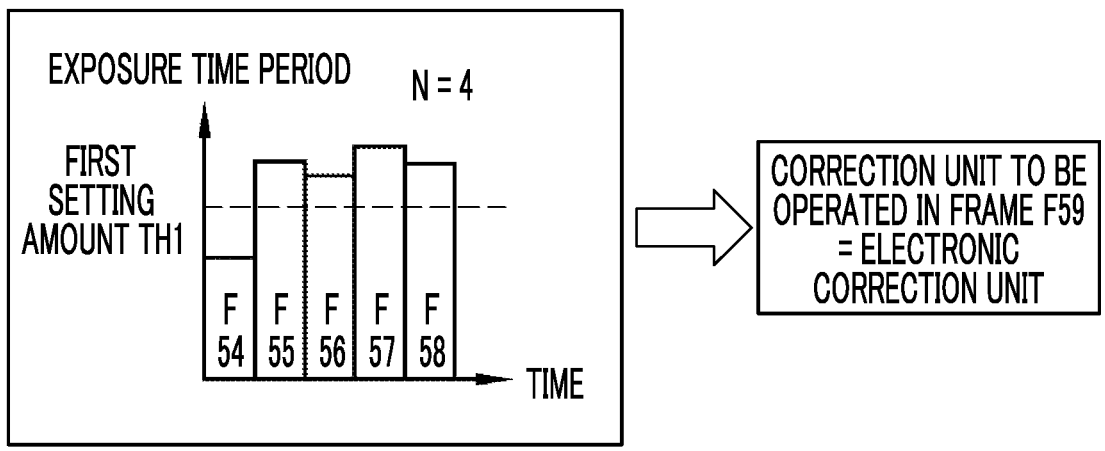
FIGS. 11A to 11C are diagrams illustrating which correction unit operates in the setting illustrated in the table of FIG. 7 in a case where the exposure time period changes as in FIG. 8.

FIG. 11A illustrates a state where a correction unit to be operated in the frame F59 is selected depending on the exposure time periods of the frame F54 to the frame F58. For the frame F54 to the frame F58, the exposure time period satisfies the operation recommendation condition 51 except for the frame F54. That is, the number N of frames satisfying the operation recommendation condition 51 is 4 and is different from 5 which is the number of frames defining the setting period SP. Thus, the operation control unit 63 operates only the electronic correction unit 33 in the frame F59 in the same manner as in a case of FIG. 9A, FIG. 9B, FIG. 10A, and FIG. 10B.

Figure 11B:
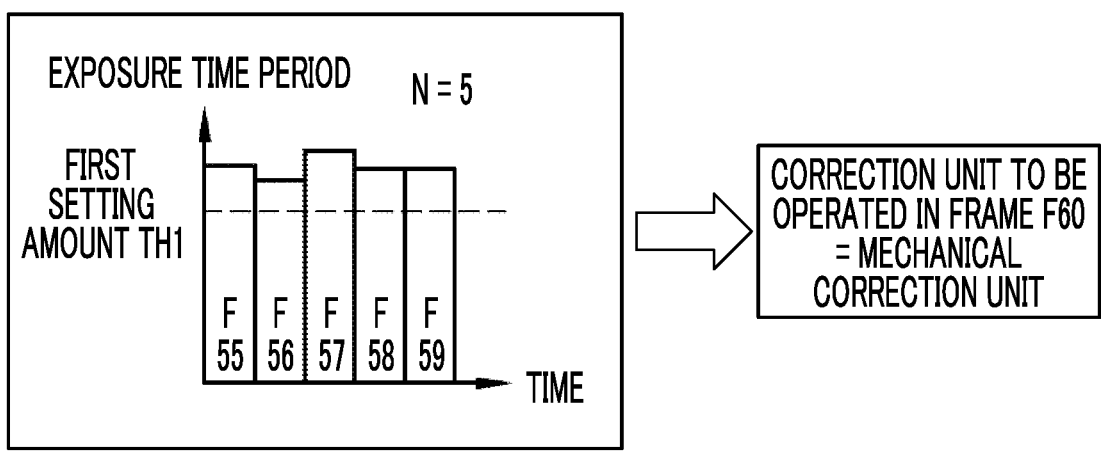

Next, FIG. 11B illustrates a state where a correction unit to be operated in the frame F60 is selected depending on the exposure time periods of the frame F55 to the frame F59. All of the exposure time periods of the frame F55 to the frame F59 satisfy the operation recommendation condition 51. That is, the number N of frames satisfying the operation recommendation condition 51 is 5 and is the same as 5 which is the number of frames defining the setting period SP. Thus, the operation control unit 63 operates only the mechanical correction unit 24 in the frame F60.

Figure 11C:
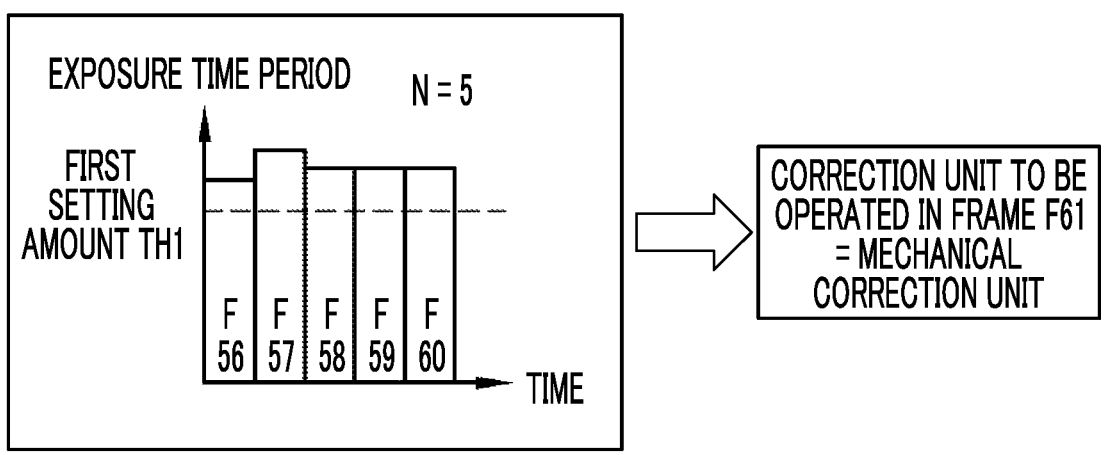

Furthermore, FIG. 11C illustrates a state where a correction unit to be operated in the frame F61 is selected depending on the exposure time periods of the frame F56 to the frame F60. All of the exposure time periods of the frame F56 to the frame F60 satisfy the operation recommendation condition 51. That is, the number N of frames satisfying the operation recommendation condition 51 is 5 and is the same as 5 which is the number of frames defining the setting period SP. Thus, the operation control unit 63 operates only the mechanical correction unit 24 in the frame F61 in the same manner as in a case of FIG. 11B.

Figure 12:
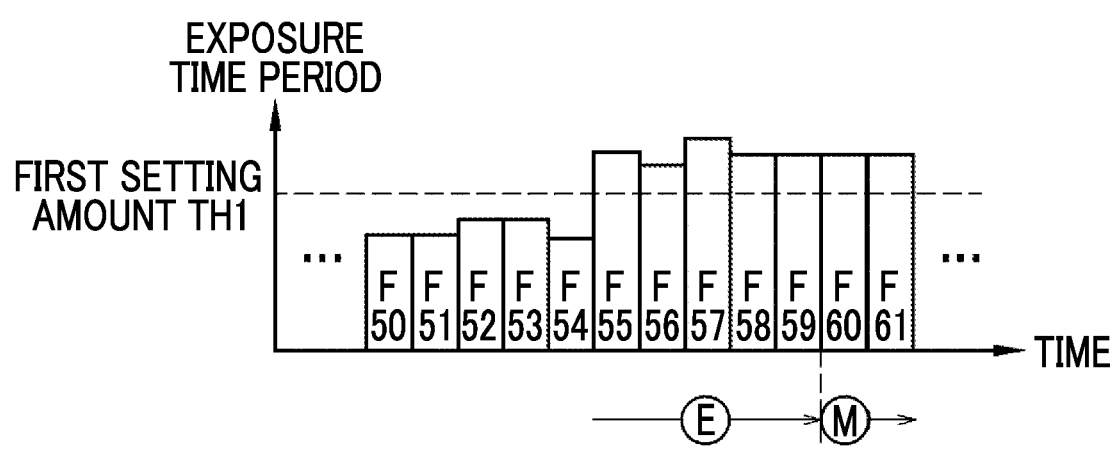
FIG. 12 is a graph summarizing description of FIG. 9A to FIG. 11C.

A summary of description of FIG. 9A to FIG. 11C is illustrated in FIG. 12. That is, in the frame F55 to the frame F59, only the electronic correction unit 33 out of the mechanical correction unit 24 and the electronic correction unit 33 is operated. However, from the frame F60, only the mechanical correction unit 24 out of the mechanical correction unit 24 and the electronic correction unit 33 is operated.

Next, an action exerted by the above configuration will be described with reference to a flowchart of FIG. 13. First, shake correction processing that is executed by the CPU 37 in accordance with the operation program 50 on a condition that an instruction to correct the shake is received by the touch panel display 42 or the like will be described. The shake correction processing is processing of causing the CPU 37 to function as the AE control unit 60, the acquisition unit 61, the storage control unit 62, and the operation control unit 63 illustrated in FIG. 3.

Figure 13:
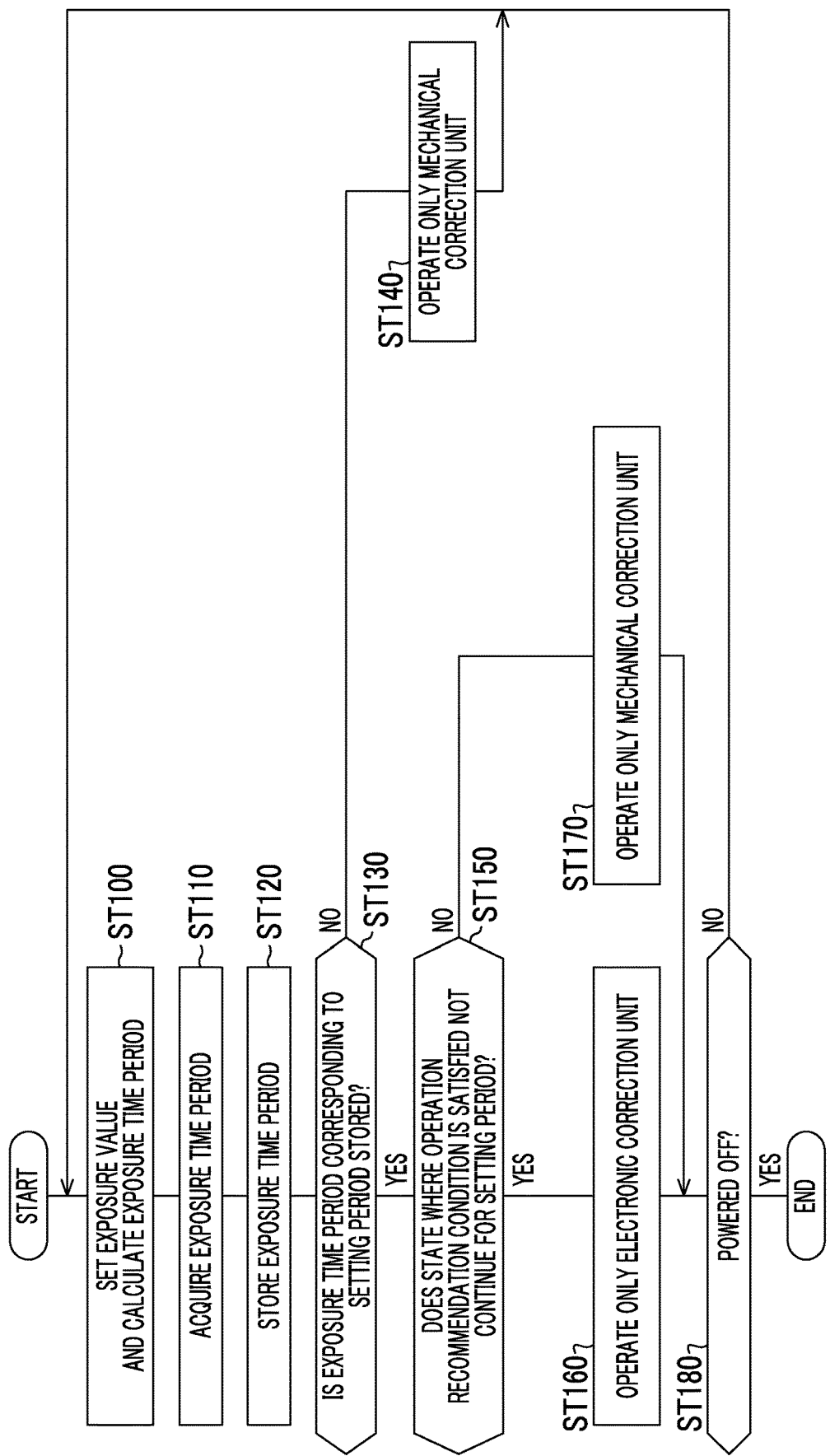
FIG. 13 is a flowchart illustrating a processing procedure of the monitoring camera.

As illustrated in step ST100 of FIG. 13, the exposure value corresponding to the measurement signal of the light quantity from the light measurement sensor 41 is set in the AE control unit 60. The exposure time period corresponding to the exposure value is calculated. The exposure time period is output to the acquisition unit 61 from the AE control unit 60.

The exposure time period from the AE control unit 60 is acquired in the acquisition unit 61 (step ST110). Step ST110 is an example of an "acquisition step" according to the embodiment of the technology of the present disclosure. The exposure time period is output to the storage control unit 62 from the acquisition unit 61 and is stored in the RAM 36 by the storage control unit 62 as illustrated in FIG. 6 (step ST120).

In a case where the exposure time period corresponding to the setting period SP is not stored in the RAM 36 at the time of start-up of the monitoring camera 10 (NO in step ST130), only the mechanical correction unit 24 out of the mechanical correction unit 24 and the electronic correction unit 33 is operated by the operation control unit 63 (step ST140). Instead of the mechanical correction unit 24, the electronic correction unit 33 may be operated in a case where the exposure time period corresponding to the setting period SP is not stored in the RAM 36 at the time of start-up of the monitoring camera 10.

In a case where the exposure time period corresponding to the setting period SP is stored in the RAM 36 (YES in step ST130), the exposure time period corresponding to the setting period SP is read out from the RAM 36 and output to the operation control unit 63 by the storage control unit 62.

In the operation control unit 63, magnitudes of the exposure time period corresponding to the setting period SP from the storage control unit 62 and the first setting amount TH1 are compared. In a case where the exposure time period is greater than or equal to the first setting amount TH1 as illustrated in FIG. 4, it is determined that the operation recommendation condition 51 is satisfied in the operation control unit 63. In this manner, the number N of frames satisfying the operation recommendation condition 51 in the setting period SP is determined.

In the operation control unit 63, the number N of frames satisfying the operation recommendation condition 51 and the number of frames defining the setting period SP are compared (step ST150).

In a case where the number N of frames satisfying the operation recommendation condition 51 is different from the number of frames defining the setting period SP, that is, in a case where a state where the exposure time period satisfies the operation recommendation condition 51 does not continue for the setting period SP (YES in step ST150), as illustrated in FIGS. 9A and 9B, FIGS. 10A and 10B, and FIG. 11A, only the electronic correction unit 33 out of the mechanical correction unit 24 and the electronic correction unit 33 is operated in the subsequent frame by the operation control unit 63 (step ST160). Meanwhile, in a case where the number N of frames satisfying the operation recommendation condition 51 is the same as the number of frames defining the setting period SP, that is, in a case where a state where the exposure time period satisfies the operation recommendation condition 51 continues for the setting period SP (NO in step ST150), as illustrated in FIG. 11B and FIG. 11C, only the mechanical correction unit 24 out of the mechanical correction unit 24 and the electronic correction unit 33 is operated in the subsequent frame by the operation control unit 63 (step ST170). Processing of each of step ST100 to any of step ST160 and step ST170 is continuously repeated until the monitoring camera 10 is powered OFF (YES in step ST180). Step ST160 and step ST170 are an example of an "operation control step" according to the embodiments of the technology of the present disclosure.

As described above, the shake correction control device 64 comprises the acquisition unit 61 and the operation control unit 63. The acquisition unit 61 acquires the exposure time period for each of the consecutive frames. In a case where a state where the exposure time period satisfies the operation recommendation condition 51 does not continue for the setting period SP, the operation control unit 63 performs a control for operating only the electronic correction unit 33 out of the mechanical correction unit 24 and the electronic correction unit 33. A probability of a case where a state where the exposure time period satisfies the operation recommendation condition 51 does not continue for the setting period SP is higher than a probability of a case where a state where the exposure time period satisfies the operation recommendation condition 51 continues for the setting period SP. Thus, an operation time period of the electronic correction unit 33 is increased. Accordingly, an operation time period of the mechanical correction unit 24 can be relatively decreased. Consequently, a lifetime of the monitoring camera 10 can be extended.

In a case where a state where the exposure time period satisfies the operation recommendation condition 51 continues for the setting period SP, the operation control unit 63 performs a control for operating only the mechanical correction unit 24 out of the mechanical correction unit 24 and the electronic correction unit 33. In a case where a state where the exposure time period satisfies the operation recommendation condition 51 continues for the setting period SP, it is considered that a shake that is difficult to correct by the electronic correction unit 33 occurs. Accordingly, by performing the above control, even a case where a shake that is difficult to correct by the electronic correction unit 33 occurs can be appropriately handled.

The operation recommendation condition 51 is a condition that the exposure time period is greater than or equal to a first setting amount TH1, and has a relatively simple content. Accordingly, a determination as to whether or not the operation recommendation condition 51 is satisfied is relatively easy.

The monitoring camera 10 used in the monitoring camera system 2 is provided with a function of the shake correction control device 64. In many cases, the monitoring camera 10 operates constantly, and thus, high durability is required, compared to other imaging apparatuses such as a digital camera for individual use. Thus, necessary for decreasing the operation time period of the mechanical correction unit 24 is high. Accordingly, in a case where the shake correction control device 64 is used in the monitoring camera system 2, a more excellent effect can be exhibited.

Figure 14:
FIG. 14 is a table illustrating another example of the setting of the processing of the operation control unit.

Setting illustrated in a table 80 of FIG. 14 may be employed instead of the setting illustrated in the table 70 of FIG. 7. In FIG. 14, the setting period SP is 2 frames. In this example, only the mechanical correction unit 24 is operated in the subsequent frame in a case where the number N of frames satisfying the operation recommendation condition 51 is 2. Meanwhile, only the electronic correction unit 33 is operated in the subsequent frame in a case where the number N of frames satisfying the operation recommendation condition 51 is 0 and 1.

Figure 15A:
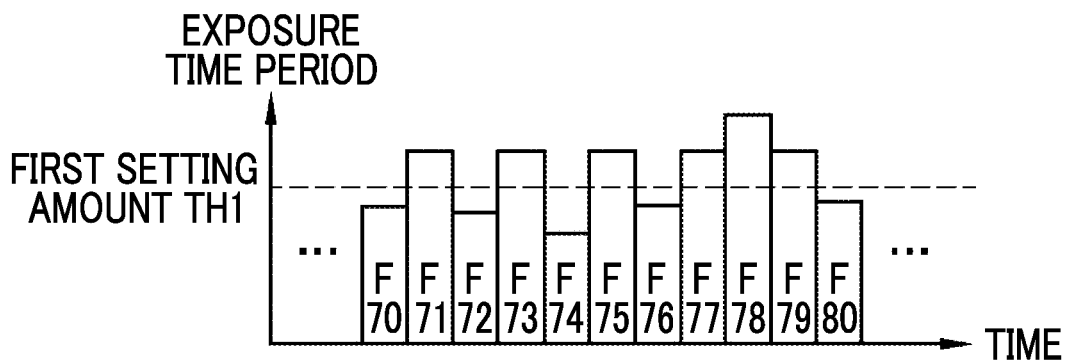
FIGS. 15A to 15C are diagrams illustrating an effect of a case of the setting illustrated in the table of FIG. 14.
Figure 15B:
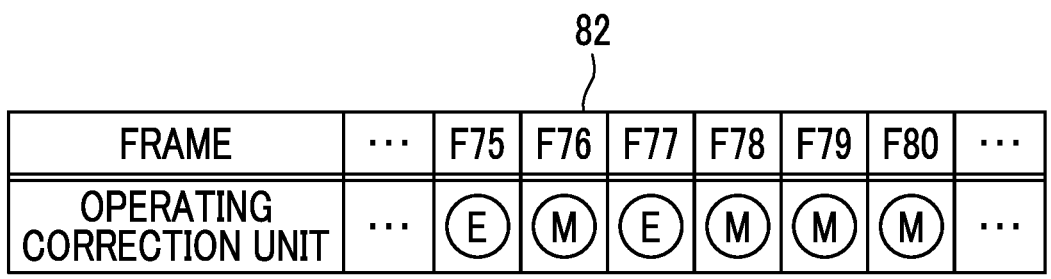
Figure 15C:
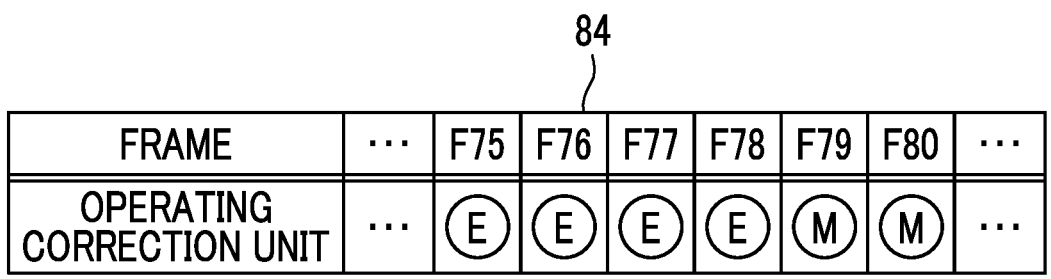

Here, a situation in which the exposure time period changes above and below the first setting amount TH1 for each frame such as a frame F70 to a frame F77 in FIG. 15A is considered. In the situation illustrated in FIG. 15A, in a case where the correction unit to be operated is switched depending on the exposure time period corresponding to 1 frame, the mechanical correction unit 24 operates in total 4 frames of the frame F76 and frames F78 to F80 among the frame F75 to the frame F80 as illustrated in a table 82 of FIG. 15B. Meanwhile, in a case of switching the correction unit to be operated in the setting illustrated in the table 80 of FIG. 14, the mechanical correction unit 24 operates in only total 2 frames of the frame F79 and the frame F80 as illustrated in a table 84 of FIG. 15C. In this manner, even in a case where the number of frames defining the setting period SP is set to 2, the operation time period of the mechanical correction unit 24 can be decreased.

Figure 16:
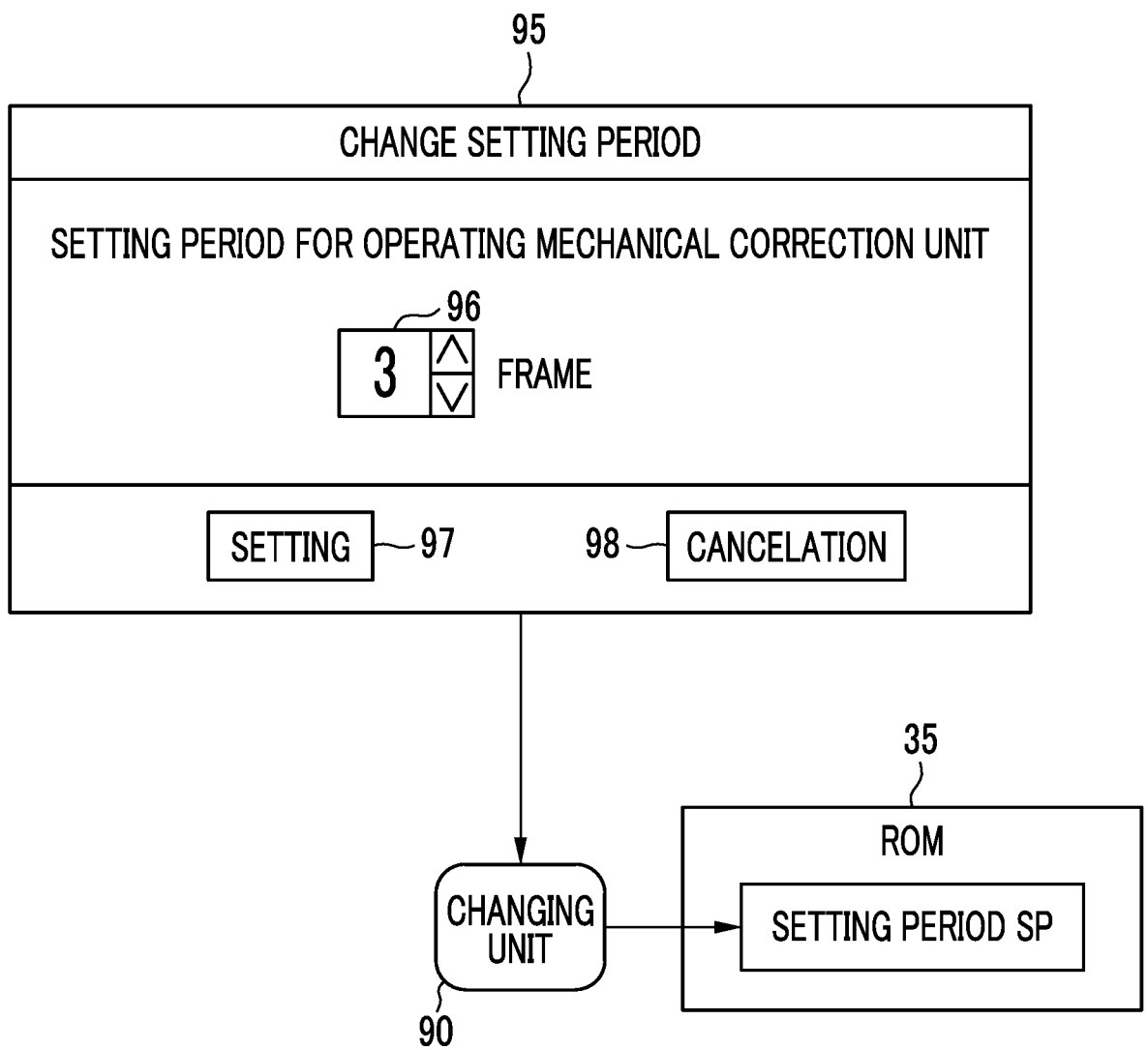
FIG. 16 is a diagram illustrating an aspect of changing a setting period.
Figure 17:
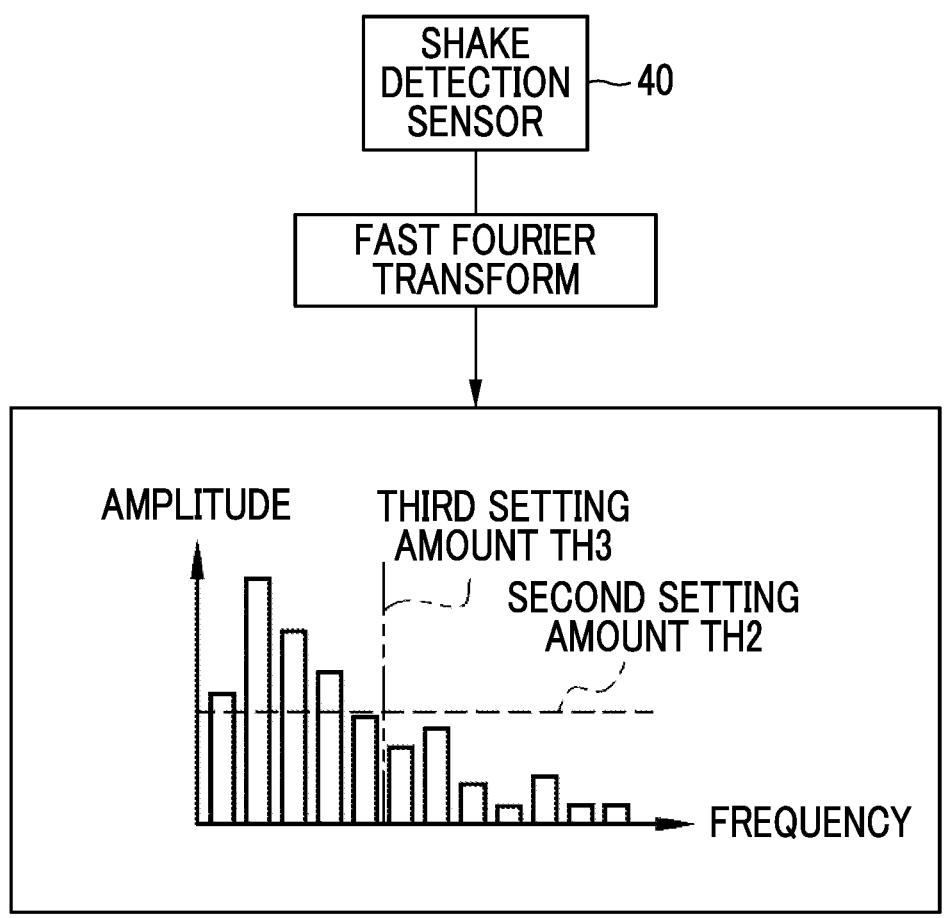
FIG. 17 is a diagram conceptually illustrating a state where a detection signal of a shake from a shake detection sensor is decomposed into a plurality of shakes of different frequencies each having an amplitude by performing a fast Fourier transform on the detection signal.

As illustrated in FIG. 16, setting of the setting period SP may be changeable by the user.

In FIG. 16, the CPU 37 functions as a changing unit 90 that changes the setting period SP. The changing unit 90 displays a setting period changing screen 95 on the touch panel display 42 in response to a request of the user. The setting period changing screen 95 comprises a spin box 96 for changing the number of frames defining the setting period SP, a setting button 97, and a cancelation button 98.

After the number of frames defining the setting period SP is set to a desired numerical value by operating the spin box 96, the setting button 97 is selected. Accordingly, a setting changing instruction for the number of frames defining the setting period SP is received by the changing unit 90. The changing unit 90 receives the setting changing instruction and rewrites the number of frames defining the setting period SP in the ROM 35 with the numerical value set by the spin box 96.

Since the changing unit 90 changing the setting period SP is comprised, various requirements can be flexibly fulfilled. Specifically, setting of decreasing the operation time period of the mechanical correction unit 24 from before the setting, or conversely, setting of increasing the operation time period of the mechanical correction unit 24 from before the setting can be performed.

As the number of frames defining the setting period SP is set to a larger value, the operation time period of the mechanical correction unit 24 can be decreased. However, in a case where the number of frames defining the setting period SP is set to an excessively large value, there is a concern that operation is not appropriately switched to the mechanical correction unit 24 in a case where a shake that is difficult to correct by the electronic correction unit 33 occurs. Thus, it is preferable to set an upper limit value for the number of frames defining the setting period SP.

The number of frames defining the setting period SP may be changed depending on other elements such as a time range. For example, in a time range (such as 8 A.M. to 5 P.M.) in which it is considered that a shake for which the operation of the mechanical correction unit 24 is recommended is likely to occur, the operation time period of the mechanical correction unit 24 is relatively increased by setting the number of frames defining the setting period SP to a relatively small value. Meanwhile, in other than the time range, the operation time period of the mechanical correction unit 24 is relatively decreased by setting the number of frames defining the setting period SP to a relatively large value.

Second Embodiment

In a second embodiment illustrated in FIG. 17 to FIG. 20B, a case where an amplitude of the shake and a frequency of the shake are employed as an example of the "related amount" according to the embodiment of the technology of the present disclosure will be described. Hereinafter, the amplitude of the shake may be simply referred to as the "amplitude". Similarly, the frequency of the shake may be simply referred to as the "frequency".

As described above, there are various types of vibrations exerted on the monitoring camera 10. Thus, it is considered that various shakes having different amplitudes and frequencies are combined in the shake detected by the shake detection sensor 40. Therefore, in the second embodiment, a fast Fourier transform is performed on the detection signal of the shake from the shake detection sensor 40 as conceptually illustrated in FIG. 17. The shake detected by the shake detection sensor 40 is decomposed into a plurality of shakes of different frequencies each having an amplitude based on a result of the fast Fourier transform. In the second embodiment, the amplitude of the shake and the frequency of the shake obtained in such a manner are acquired as the related amount by the acquisition unit 61. For example, the detection signal of the shake on which the fast Fourier transform is performed is a detection signal of the acceleration sensor detecting a shift shake within a plane parallel to the pitch axis PA and the yaw axis YA.

Figure 18:
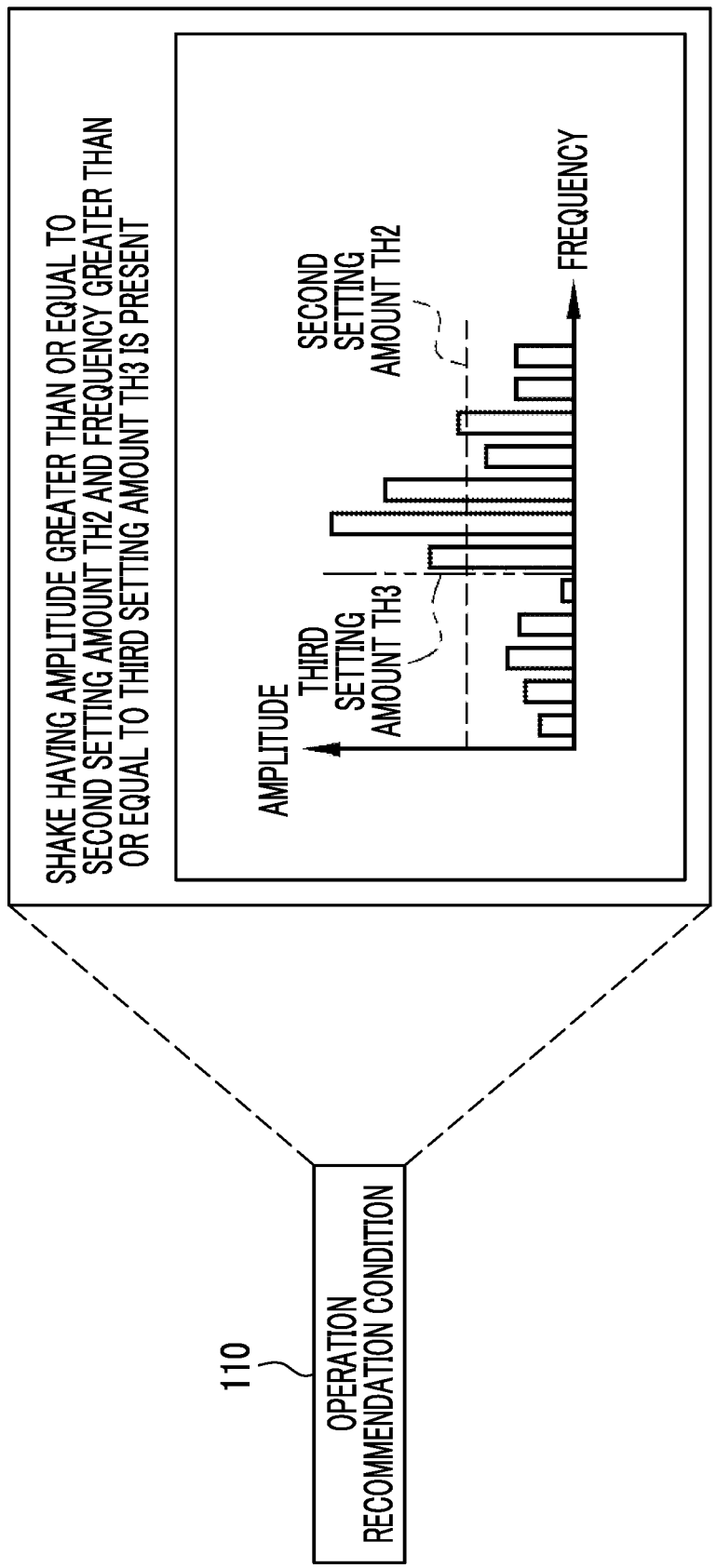
FIG. 18 is a diagram illustrating a content of an operation recommendation condition of a second embodiment.

A second setting amount TH2 is set for the amplitude, and a third setting amount TH3 is set for the frequency. As illustrated in FIG. 18, an operation recommendation condition 110 is a condition that a shake having an amplitude greater than or equal to the second setting amount TH2 and a frequency greater than or equal to the third setting amount TH3 is present. That is, in a case where there is at least one shake having an amplitude greater than or equal to the second setting amount TH2 and a frequency greater than or equal to the third setting amount TH3 among the plurality of shakes decomposed by amplitude and frequency using the fast Fourier transform, the operation recommendation condition 110 is satisfied. Subsequent processing is the same as in the first embodiment except that the amplitude of the shake and the frequency of the shake are employed as the related amount instead of the exposure time period, and thus, will not be described.

In the second embodiment, the amplitude of the shake and the frequency of the shake are employed as the related amount. The condition that a shake having an amplitude greater than or equal to the second setting amount TH2 and a frequency greater than or equal to the third setting amount TH3 is present is employed as the operation recommendation condition 110. Accordingly, the operation control unit 63 can operate a correction unit appropriate for a type of actually occurring shake.

Figure 19:
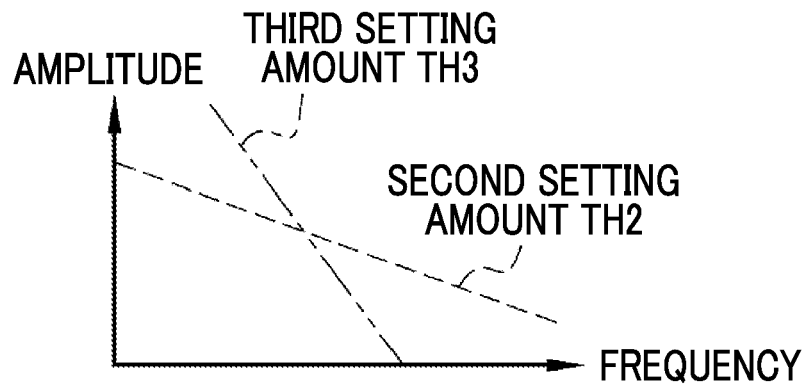
FIG. 19 is a graph illustrating an aspect of setting a second setting amount as an amount that is decreased as a frequency is increased, and setting a third setting amount as an amount that is decreased as an amplitude is increased.

As illustrated in FIG. 19, the second setting amount TH2 may be an amount that is decreased as the frequency is increased. A reason for doing so is that in a case where shakes having the same amplitude and different frequencies are present, an amount of the shake within the same exposure time period is increased as the frequency of the shake is increased. In a case where the second setting amount TH2 is set as an amount that is decreased as the frequency is increased, the operation recommendation condition 110 can be a more appropriate condition.

In addition, the third setting amount TH3 may be an amount that is decreased as the amplitude is increased. A reason for doing so is that in a case where shakes having the same frequency and different amplitudes are present, the amount of the shake within the same exposure time period is increased as the amplitude of the shake is increased. In a case where the third setting amount TH3 is set as an amount that is decreased as the amplitude is increased, the operation recommendation condition 110 can be a more appropriate condition.

Figure 20A:
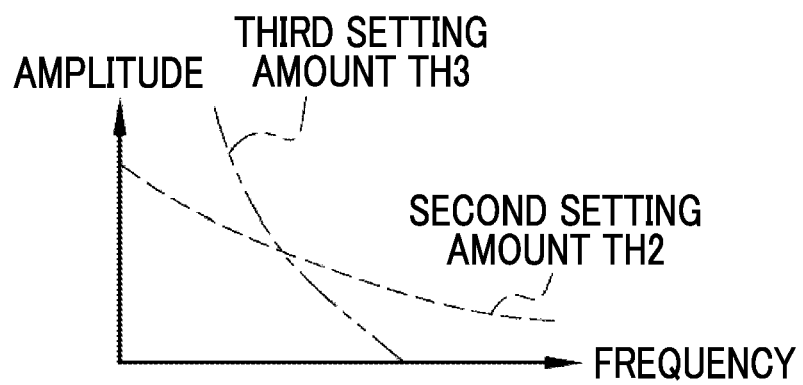
FIGS. 20A and 20B are graphs illustrating variations in change of the second setting amount and the third setting amount.
Figure 20B:
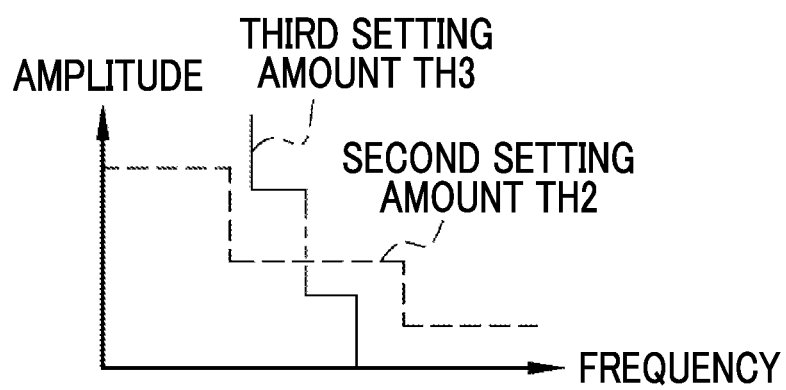

In FIG. 19, the second setting amount TH2 and the third setting amount TH3 change linearly. However, the technology of the present disclosure is not limited thereto. The second setting amount TH2 and the third setting amount TH3 may be changed in a curved manner as illustrated in FIG. 20A, as long as the second setting amount TH2 is an amount that is decreased as the frequency is increased, and the third setting amount TH3 is an amount that is decreased as the amplitude is increased. In addition, the second setting amount TH2 and the third setting amount TH3 may be changed stepwise as illustrated in FIG. 20B. In addition, by combining these variations, for example, the second setting amount TH2 may be linearly changed, and the third setting amount TH3 may be changed in a curved manner.

Third Embodiment

In a third embodiment illustrated in FIG. 21 and FIG. 22, a case where the amount of the shake within the exposure time period is employed as an example of the "related amount" according to the embodiment of the technology of the present disclosure will be described.

Figure 21:
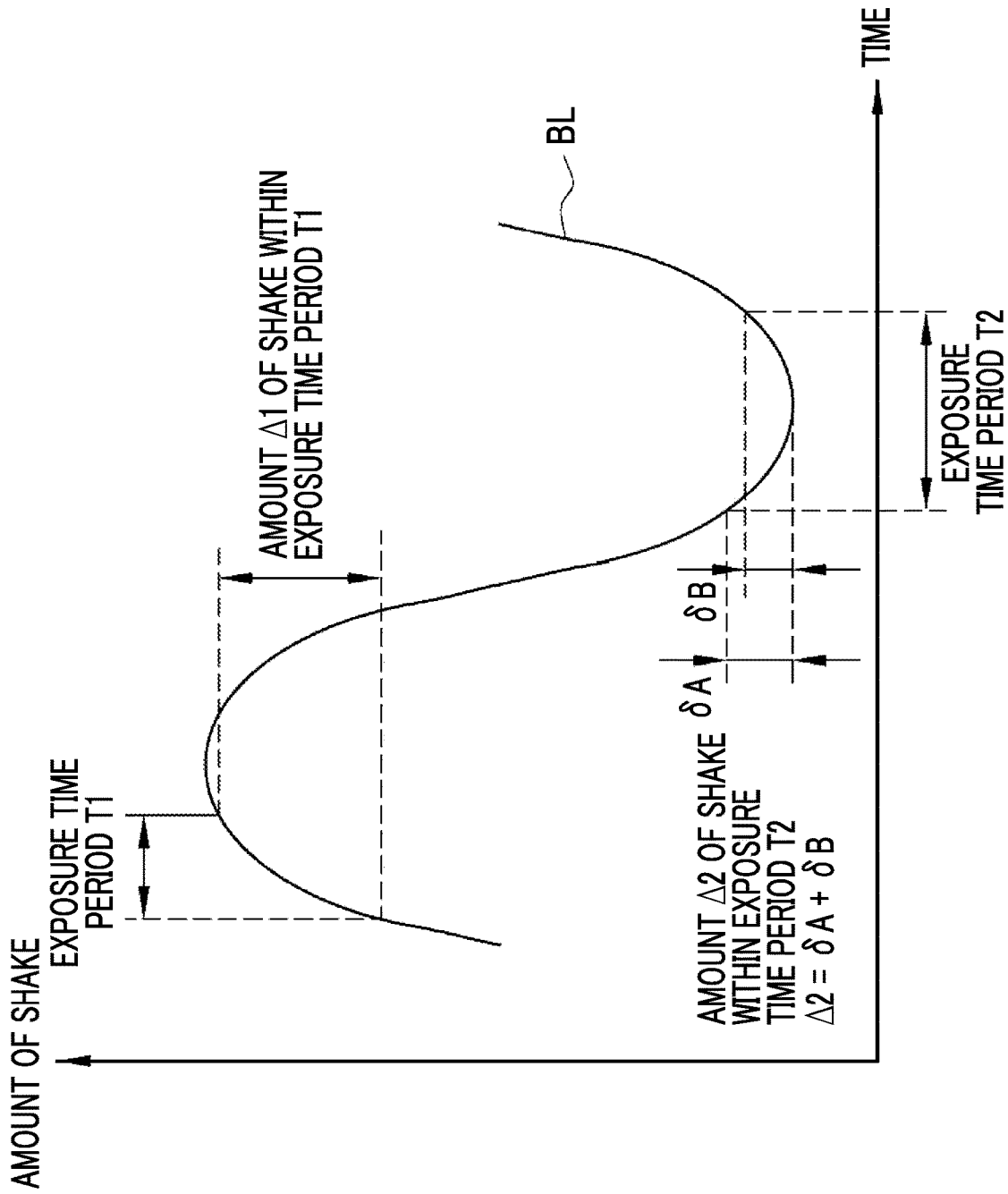
FIG. 21 is a diagram illustrating an amount of the shake within the exposure time period with respect to the shake detected by the shake detection sensor in a certain time period.

FIG. 21 is a diagram illustrating the amount of the shake within the exposure time period with respect to a shake BL detected by the shake detection sensor 40 in a certain time period. In a case of an exposure time period T1 that does not extend across a vertex of a waveform of the shake BL, the amount of the shake is an absolute value 41 of a difference in amount of the shake between a time of start of the exposure time period T1 and a time of end of the exposure time period T1. Meanwhile, in a case of an exposure time period T2 that extends across the vertex of the waveform of the shake BL, the amount of the shake is Δ2 obtained by adding δA to δB. Here, δA is an absolute value of a difference between the amount of the shake at a time of start of the exposure time period T2 and the amount of the shake at the vertex of the waveform of the shake BL. In addition, δB is an absolute value of a difference between the amount of the shake at a time of end of the exposure time period T2 and the amount of the shake at the vertex of the waveform of the shake BL. In the third embodiment, the amount of the shake within the exposure time period obtained in such a manner is acquired as the related amount by the acquisition unit 61.

Figure 22:
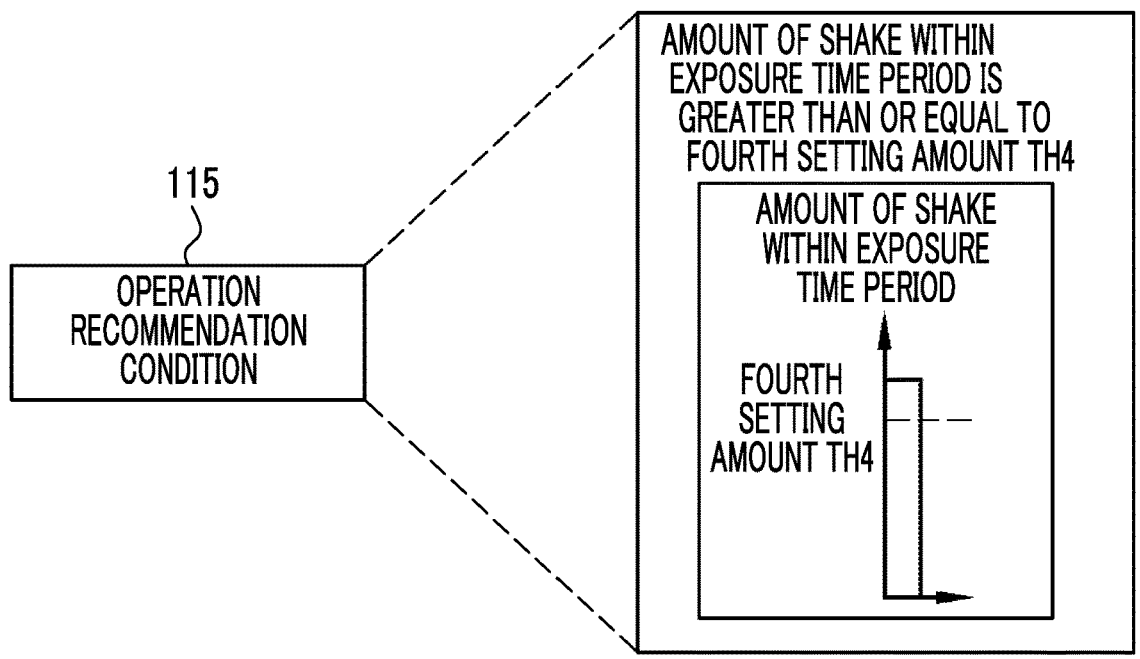
FIG. 22 is a diagram illustrating a content of an operation recommendation condition of a third embodiment.

As illustrated in FIG. 22, an operation recommendation condition 115 is a condition that the amount of the shake within the exposure time period is greater than or equal to a fourth setting amount TH4. Subsequent processing is the same as in the first embodiment except that the amount of the shake within the exposure time period is employed as the related amount instead of the exposure time period, and thus, will not be described.

In the third embodiment, the amount of the shake within the exposure time period is employed as the related amount. The condition that the amount of the shake within the exposure time period is greater than or equal to the fourth setting amount TH4 is employed as the operation recommendation condition 115. Accordingly, the operation control unit 63 can operate a correction unit appropriate for the amount of the actually occurring shake.

The first embodiment and the second embodiment may be implemented in combination. In this case, the operation recommendation condition is a condition that the exposure time period is greater than or equal to the first setting amount TH1, and that a shake having an amplitude greater than or equal to the second setting amount TH2 and a frequency greater than or equal to the third setting amount TH3 is present.

Figure 23A:
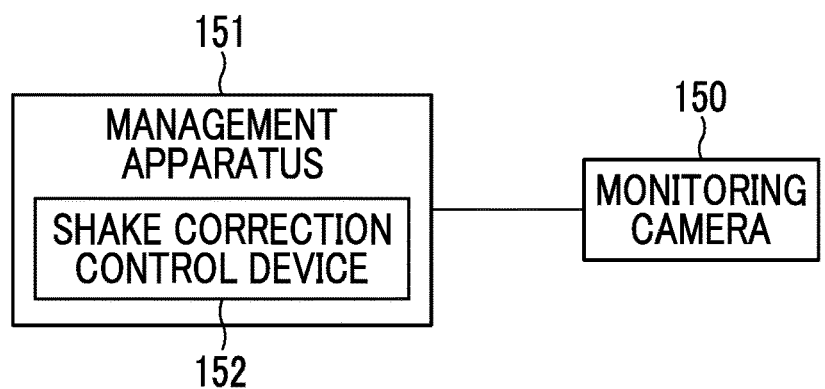
FIGS. 23A and 23B are diagrams illustrating variations in location of the shake correction control device.
Figure 23B:
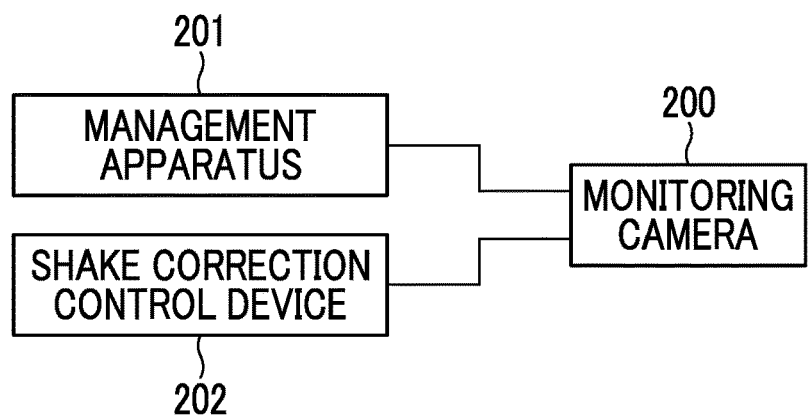

In each of the embodiments, the monitoring camera 10 is provided with the function of the shake correction control device 64. However, the technology of the present disclosure is not limited thereto. As illustrated in FIG. 23A, instead of a monitoring camera 150, a management apparatus 151 may be provided with a function of a shake correction control device 152. Alternatively, as illustrated in FIG. 23B, a shake correction control device 202 may be disposed separately from a monitoring camera 200 and a management apparatus 201.

In each of the embodiments, in a case where a state where the related amount such as the exposure time period satisfies the operation recommendation condition continues for the setting period SP, a control for operating only the mechanical correction unit 24 out of the mechanical correction unit 24 and the electronic correction unit 33 is performed. However, the technology of the present disclosure is not limited thereto. In a case where a state where the related amount such as the exposure time period satisfies the operation recommendation condition continues for the setting period SP, not only the mechanical correction unit 24 but also the electronic correction unit 33 may be operated in an auxiliary manner. For example, the mechanical correction unit 24 is operated for 80 percent of correction, and the electronic correction unit 33 is operated for 20 percent of correction. In a case where the electronic correction unit 33 is operated in an auxiliary manner, an operation load of the mechanical correction unit 24 is reduced. Thus, the lifetime of the monitoring camera 10 can be further extended.

In each of the embodiments, the mechanical correction unit 24 that mechanically moves the correction optical system 19 is illustrated. However, the technology of the present disclosure is not limited thereto. A mechanical correction unit that mechanically moves the imaging element 25 may be used, or a mechanical correction unit that mechanically moves both of the correction optical system 19 and the imaging element 25 may be used.

The predetermined time at which the related amount is acquired may not be a time defined by a frame. For example, in a case of the second embodiment in which the related amount is the amplitude and the frequency of the shake, the predetermined time at which the related amount is acquired may be a time that is defined by a sampling interval of the detection signal of the shake detection sensor 40.

Similarly, the plurality of consecutive times defining the setting period may not be the plurality of consecutive frames, and the related amount may not be acquired for each of the consecutive frames. For example, the related amount may be acquired for each odd-numbered frame.

The technology of the present disclosure may be applied to not only a case of imaging the motion picture but also so-called interval imaging of imaging a still picture at intervals of seconds. In this case, in order to reduce power consumption, the shake detection sensor 40, the light measurement sensor 41, and the CPU 37 may not be operated during imaging of the still picture and, for example, may be started up 10 frames before an imaging timing of the still picture.

The technology of the present disclosure can also be applied to an imaging apparatus other than the monitoring camera, for example, a digital camera for individual use, a smartphone, or a tablet terminal.

In each of the embodiments, for example, the following various processors can be used as a hardware structure of a processing unit executing various types of processing of the AE control unit 60, the acquisition unit 61, the storage control unit 62, the operation control unit 63, and the changing unit 90. The various processors include, in addition to the CPU that is a general-purpose processor functioning as various processing units by executing software (operation program 50) as described above, a programmable logic device (PLD) such as a field programmable gate array (FPGA) that is a processor having a circuit configuration changeable after manufacturing, and/or a dedicated electric circuit or the like such as an application specific integrated circuit (ASIC) that is a processor having a circuit configuration dedicatedly designed to execute a specific type of processing. A memory is incorporated in or connected to any of the processors, and any of the processors executes various types of processing using the memory.

One processing unit may be configured with one of the various processors or may be configured with a combination of two or more processors of the same type or different types (for example, a combination of a plurality of FPGAs and/or a combination of the CPU and the FPGA). In addition, a plurality of processing units may be configured with one processor.

As an example of configuring the plurality of processing units with one processor, first, as represented by a computer such as a client and a server, a form of configuring one processor with a combination of one or more CPUs and software and causing the processor to function as the plurality of processing units is present. Second, as represented by a system on chip (SoC) or the like, a form of using a processor that implements the function of the entire system including the plurality of processing units using one integrated circuit (IC) chip is present. Accordingly, various processing units are configured using one or more of the various processors as the hardware structure.

Furthermore, more specifically, an electric circuit (circuitry) in which circuit elements such as semiconductor elements are combined can be used as the hardware structure of the various processors.

The invention disclosed in Appendix 1 and Appendix 2 below can be perceived from the above disclosure.

APPENDIX 1

A shake correction control device comprising an acquisition processor configured to acquire, for each predetermined time, a related amount related to an operation recommendation condition under which an operation of a mechanical correction unit which corrects a shake of a subject image by mechanically moving at least one of a correction optical system or an imaging element is recommended, and an operation control processor configured to control the operation of the mechanical correction unit and an operation of an electronic correction unit which corrects the shake by performing image processing on an image obtained by imaging performed by the imaging element, and perform a control for operating only the electronic correction unit out of the mechanical correction unit and the electronic correction unit in a case where a state where the related amount acquired in the acquisition processor satisfies the operation recommendation condition does not continue for a setting period defined by a time series of a plurality of consecutive times.

APPENDIX 2

A shake correction control device comprising a processor, and a memory that is connected to or incorporated in the processor, in which the processor is configured to acquire, for each predetermined time, a related amount related to an operation recommendation condition under which an operation of a mechanical correction unit which corrects a shake of a subject image by mechanically moving at least one of a correction optical system or an imaging element is recommended, and control the operation of the mechanical correction unit and an operation of an electronic correction unit which corrects the shake by performing image processing on an image obtained by imaging performed by the imaging element, and perform a control for operating only the electronic correction unit out of the mechanical correction unit and the electronic correction unit in a case where a state where the related amount acquired in the acquisition processor satisfies the operation recommendation condition does not continue for a setting period defined by a time series of a plurality of consecutive times.

In the technology of the present disclosure, the various embodiments and/or various modification examples can be appropriately combined. In addition, the technology of the present disclosure is not limited to each of the embodiments and may employ various configurations without departing from a gist. Furthermore, the technology of the present disclosure includes, in addition to the program, a storage medium that stores the program in a non-transitory manner.

Above described contents and illustrated contents are detailed description for parts according to the embodiment of the technology of the present disclosure and are merely an example of the technology of the present disclosure. For example, description related to the above configurations, functions, actions, and effects is description related to an example of configurations, functions, actions, and effects of the parts according to the embodiment of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, and technical standards is specifically and individually indicated to be incorporated herein by reference.

What is claimed is:

1. A shake correction control device comprising:
an acquisition unit that acquires, for each predetermined time, a related amount related to an operation recommendation condition under which an operation of a mechanical correction unit which corrects a shake of a subject image by mechanically moving at least one of a correction optical system or an imaging element is recommended; and
an operation control unit that controls the operation of the mechanical correction unit and an operation of an electronic correction unit which corrects the shake by performing image processing on an image obtained by imaging performed by the imaging element, and performs a control for operating only the electronic correction unit out of the mechanical correction unit and the electronic correction unit in a case where a state where the related amount acquired in the acquisition unit satisfies the operation recommendation condition does not continue for a setting period defined by a time series of a plurality of consecutive times.

2. The shake correction control device according to claim 1,
wherein in a case where a state where the related amount acquired in the acquisition unit satisfies the operation recommendation condition continues for the setting period, the operation control unit performs a control for operating only the mechanical correction unit out of the mechanical correction unit and the electronic correction unit.

3. The shake correction control device according to claim 1, further comprising:
a changing unit that changes the setting period.

4. The shake correction control device according to claim 1,
wherein the related amount is an exposure time period of the subject image in the imaging element.

5. The shake correction control device according to claim 4,
wherein the operation recommendation condition is a condition that the exposure time period is greater than or equal to a first setting amount.

6. The shake correction control device according to claim 1,
wherein the related amount is an amplitude of the shake and a frequency of the shake.

7. The shake correction control device according to claim 6,
wherein the operation recommendation condition is a condition that a shake having the amplitude greater than or equal to a second setting amount and the frequency greater than or equal to a third setting amount is present.

8. The shake correction control device according to claim 7,
wherein the second setting amount is an amount that is decreased as the frequency is increased.

9. The shake correction control device according to claim 7,
wherein the third setting amount is an amount that is decreased as the amplitude is increased.

10. The shake correction control device according to claim 1,
wherein the related amount is an amount of the shake within an exposure time period of the subject image in the imaging element.

11. The shake correction control device according to claim 10,
wherein the operation recommendation condition is a condition that the amount of the shake is greater than or equal to a fourth setting amount.

12. The shake correction control device according to claim 1,
wherein the acquisition unit acquires the related amount for each of consecutive frames.

13. The shake correction control device according to claim 1,
wherein the shake correction control device is used in a monitoring camera system.

14. An imaging apparatus comprising:
the shake correction control device according to claim 1.

15. The shake correction control device according to claim 2, further comprising:
a changing unit that changes the setting period.

16. The shake correction control device according to claim 2,
wherein the related amount is an exposure time period of the subject image in the imaging element.

17. The shake correction control device according to claim 3,
wherein the related amount is an exposure time period of the subject image in the imaging element.

18. The shake correction control device according to claim 2,
wherein the related amount is an amplitude of the shake and a frequency of the shake.

19. An operation method of a shake correction control device, the operation method comprising:
an acquisition step of acquiring, for each predetermined time, a related amount related to an operation recommendation condition under which an operation of a mechanical correction unit which corrects a shake of a subject image by mechanically moving at least one of a correction optical system or an imaging element is recommended; and
an operation control step of controlling the operation of the mechanical correction unit and an operation of an electronic correction unit which corrects the shake by performing image processing on an image obtained by imaging performed by the imaging element, and performing a control for operating only the electronic correction unit out of the mechanical correction unit and the electronic correction unit in a case where a state where the related amount acquired in the acquisition step satisfies the operation recommendation condition does not continue for a setting period defined by a time series of a plurality of consecutive times.

20. A non-transitory computer-readable storage medium storing an operation program of a shake correction control device causing a computer to function as:
an acquisition unit that acquires, for each predetermined time, a related amount related to an operation recommendation condition under which an operation of a mechanical correction unit which corrects a shake of a subject image by mechanically moving at least one of a correction optical system or an imaging element is recommended; and
an operation control unit that controls the operation of the mechanical correction unit and an operation of an electronic correction unit which corrects the shake by performing image processing on an image obtained by imaging performed by the imaging element, and performs a control for operating only the electronic correction unit out of the mechanical correction unit and the electronic correction unit in a case where a state where the related amount acquired in the acquisition unit satisfies the operation recommendation condition does not continue for a setting period defined by a time series of a plurality of consecutive times.

* * * * *